United States Patent
Doi et al.

(10) Patent No.: US 7,919,156 B2
(45) Date of Patent: Apr. 5, 2011

(54) RECORDING APPARATUS AND MATERIAL SET FOR RECORDING

(75) Inventors: Takatsugu Doi, Kanagawa (JP); Ken Hashimoto, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 186 days.

(21) Appl. No.: 12/275,291

(22) Filed: Nov. 21, 2008

(65) Prior Publication Data

US 2009/0227728 A1    Sep. 10, 2009

(30) Foreign Application Priority Data

Mar. 7, 2008    (JP) ................... 2008-057559

(51) Int. Cl.
*B41M 5/50*    (2006.01)

(52) U.S. Cl. .......... 428/32.38; 428/32.34; 524/556; 524/558; 523/160; 523/161; 347/100; 347/105; 347/106

(58) Field of Classification Search .......... 523/160, 523/161; 347/100, 105, 106; 524/556, 558; 428/32.34, 32.38

See application file for complete search history.

(56) References Cited

U.S. PATENT DOCUMENTS

| | | |
|---|---|---|
| 2006/0284951 A1 | 12/2006 | Ikeda et al. |
| 2006/0286315 A1 | 12/2006 | Hashimoto et al. |
| 2008/0032074 A1 | 2/2008 | Doi et al. |

FOREIGN PATENT DOCUMENTS

| | | |
|---|---|---|
| JP | 2001-011349 | 1/2001 |
| JP | 2006-347081 | 12/2006 |
| JP | 2006-347085 | 12/2006 |
| JP | 2007-168101 | 7/2007 |
| JP | 2007-168400 | 7/2007 |
| JP | 2007-168406 | 7/2007 |
| JP | 2008-36873 | 2/2008 |

*Primary Examiner* — David Wu
*Assistant Examiner* — Vu A Nguyen
(74) *Attorney, Agent, or Firm* — Fildes & Outland, P.C.

(57) ABSTRACT

Disclosed is a material set for recording, including: an ink including a recording material, an organic solvent, and water; and ink receiving particles including an organic resin including hydrophilic monomer components and one or more hydrophobic monomer components, the hydrophilic monomer components including a monomer component having a hydroxyl group and a monomer component having a dissociable group, an absolute value of a difference between a solubility parameter (SP value) of the organic solvent included in the ink and a solubility parameter (SP value) of monomer components included in the organic resin, other than the monomer component having a dissociable group, being less than 5.

13 Claims, 10 Drawing Sheets

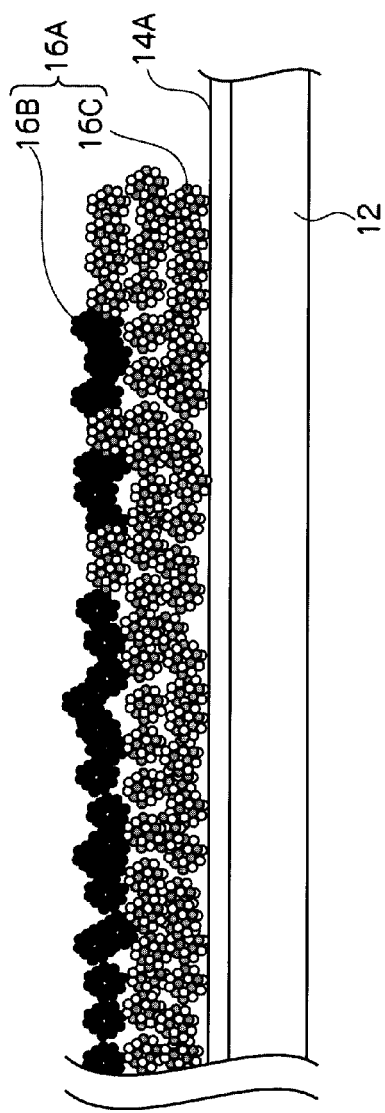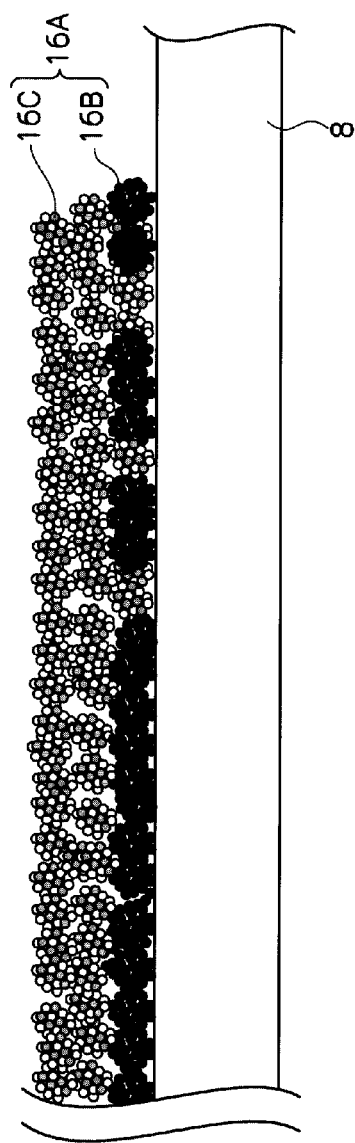
FIG. 7A
FIG. 7B

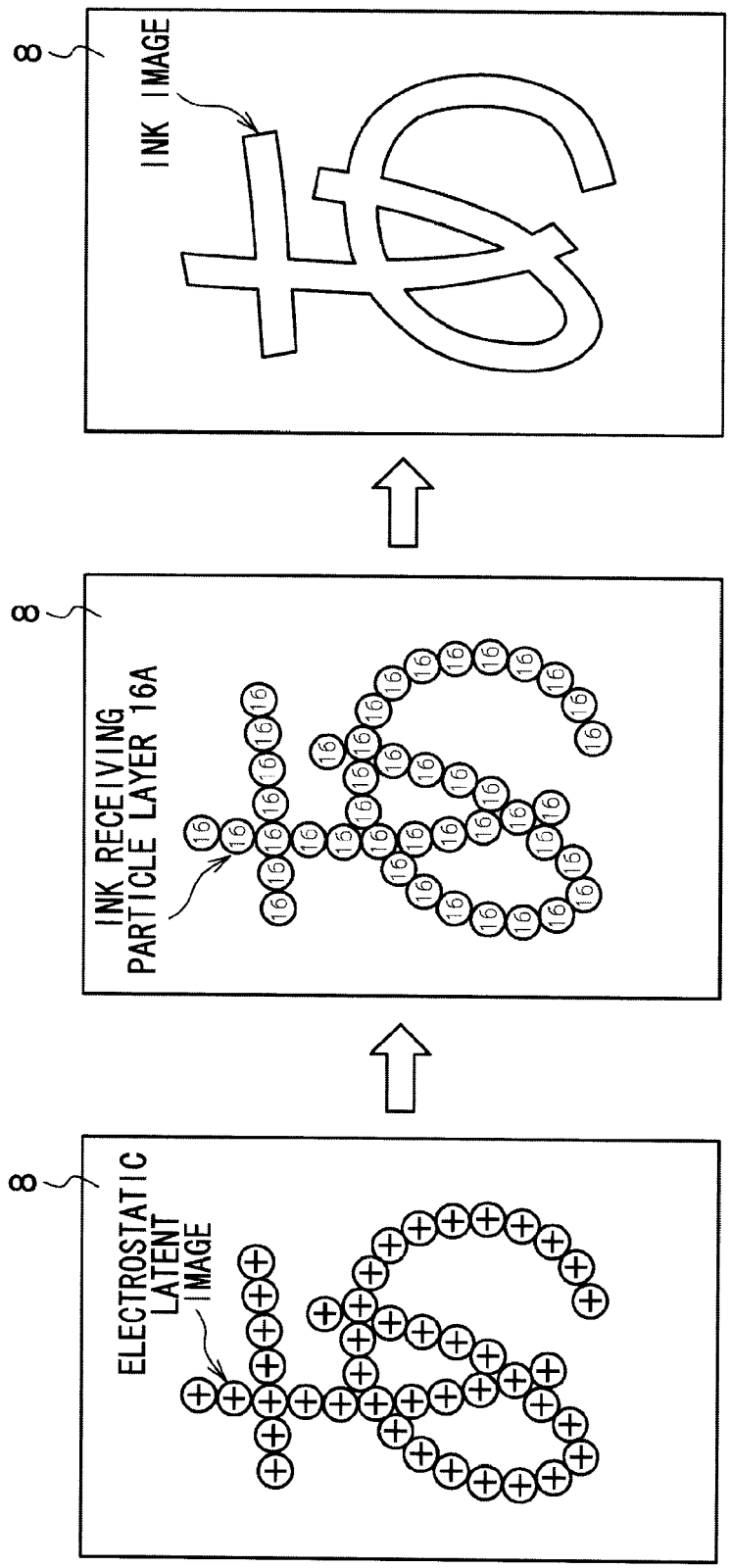

RECORDING APPARATUS AND MATERIAL SET FOR RECORDING

CROSS-REFERENCE TO RELATED APPLICATIONS

This application is based on and claims priority under 35 USC 119 from Japanese Patent Application No. 2008-057559 filed Mar. 7, 2008.

BACKGROUND

1. Technical Field

The present invention relates to a recording apparatus and a material set for recording.

2. Related Art

The ink jet recording method is known as one method of recording images and data using ink. The mechanism of the ink jet recording method is such that the ink in the form of a liquid or a melted solid is ejected from a nozzle, slit, porous film or the like onto paper, cloth, film or the like to record. As a method of ejecting ink, various methods have been proposed such as a charge control method in which ink is ejected by electrostatic attraction force; a drop on demand method (pressure pulse method) in which ink is ejected by oscillation pressure of piezo elements; and a thermal ink jet method in which ink is ejected by pressure generated by forming and growing of air bubbles under high temperature. Images or data of extremely high definition can be recorded by these methods.

Among the recording methods using ink, including these ink jet recording methods, a method has been proposed in which an image is first recorded on an intermediate member, and the image is then transferred onto a recording medium.

SUMMARY

According to an aspect of the invention, there is provided a material set for recording, comprising:

an ink comprising a recording material, an organic solvent, and water; and ink receiving particles comprising an organic resin comprising hydrophilic monomer components and one or more hydrophobic monomer components, the hydrophilic monomer components comprising a monomer component having a hydroxyl group and a monomer component having a dissociable group, an absolute value of a difference between a solubility parameter (SP value) of the organic solvent included in the ink and a solubility parameter (SP value) of monomer components included in the organic resin, other than the monomer component having a dissociable group, being less than 5.

BRIEF DESCRIPTION OF THE DRAWINGS

Exemplary embodiments of the present invention will be described in detail based on the following figures, wherein:

FIGS. 7A and 7B are configurational drawings that illustrate ink receiving particle layers according to an exemplary embodiment;

FIGS. 10A, 10B, and 10C schematically illustrate a process of image formation in a recording apparatus according to another exemplary embodiment.

DETAILED DESCRIPTION

Figure 1:
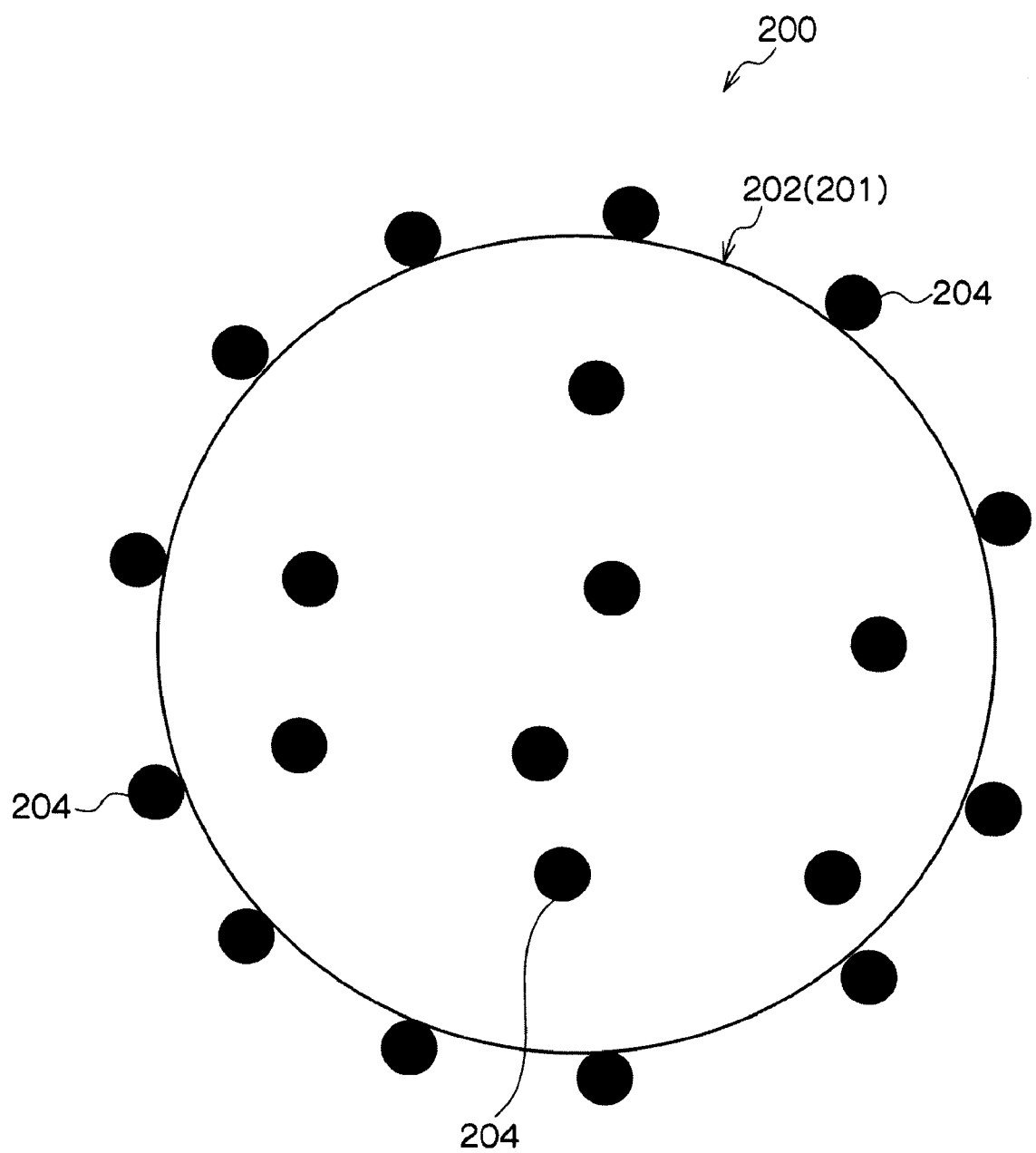
FIG. 1 is a schematic diagram that illustrates one example of ink receiving particles according to an exemplary embodiment.

Hereinafter, an exemplary embodiment of the present invention will be described in detail.

[Material Set for Recording]

A material set for recording according to an exemplary embodiment comprises at least an ink and ink receiving particles. The material set for recording is a material set with which recording may be carried out by allowing ink receiving particles to receive an ink and transferring the ink receiving particles onto a recording medium, or by applying ink receiving particles onto a recording medium and allowing the ink receiving particles to receive an ink.

In the material set for recording according to the exemplary embodiment, the ink comprises a recording material, an organic solvent, and water. The ink receiving particles comprise an organic resin comprising hydrophilic monomer components and one or more hydrophobic monomer components, the hydrophilic monomer components comprising a monomer component having a hydroxyl group and a monomer component having a dissociable group. The ink and the ink receiving particles are selected such that an absolute value of a difference between a solubility parameter (SP value) of the organic solvent included in the ink and a solubility parameter (SP value) of monomer components included in the organic resin, other than the monomer component having a dissociable group, is less than 5.

In the material set for recording according to the exemplary embodiment, owing to the above described composition, the liquid absorbing property of the ink receiving particles with respect to the ink may be improved. Thus, by applying this material set for recording to a recording apparatus, high speed recording may be carried out on various recording media. The reason for this effect is uncertain, but it may be considered that the affinity between the organic solvent included in the ink and the organic resin included in the ink receiving particles contributes to the liquid absorbing property of the ink receiving particles with respect to the ink, and thus, the composition increasing this affinity leads to the above effect.

Respective materials are explained below in detail.

(Ink Receiving Particles)

Ink receiving particles of the exemplary embodiment receive an ink component when an ink is brought into contact with the particles. Here, "ink receiving" indicates the retention of at least a part of the ink component (at least a liquid component). The ink receiving particles comprise a specific organic resin (which is hereinafter referred to as a hydrophilic resin) described later.

First, the particle configuration of the ink receiving particles according to the exemplary embodiment will be described.

The ink receiving particles according to the exemplary embodiment may be composed of single particles of hydrophilic particles (also referred to as "primary particles" in the following) including the above-described hydrophilic resin, or may be composite particles formed by aggregating at least hydrophilic particles. The single hydrophilic particle or the composite particle made by aggregating at least hydrophilic particles may be referred to as a "host particle".

Here, in the case of a configuration in which the ink receiving particles consist of single particles of hydrophilic particles, when ink receiving particles receive ink, ink is attached to ink receiving particles, and at least a liquid component of the ink is absorbed by the hydrophilic particles.

Thus, the ink receiving particles receive the ink. Then, recording is performed by transferring the ink receiving particles that have received the ink to a recording medium.

Further, in the case of a configuration in which the ink receiving particles consist of composite particles in which at least hydrophilic particles are aggregated, when the ink receiving particles receive ink, ink is first attached to the ink receiving particles and then at least a liquid component of ink is trapped by a void (a void between particles is also referred to as a "trap structure" in the following) between the particles (at least hydrophilic particles) constituting the composite particles. At this time, a recording material among the ink components is attached to an ink receiving particle surface or trapped by the trap structure. Then, the ink present in the voids is absorbed by the particles. Thus, the ink receiving particles receive the ink. Then, recording is performed by transferring the ink receiving particles that have received the ink to a recording medium.

The trapping of the ink component (liquid component; recording material) by this trap structure is a physical and/or chemical trapping by a void between particles (a physical particle wall structure).

By employing a configuration of composite particles in which at least hydrophilic particles are aggregated, the ink liquid component is absorbed and retained by the hydrophilic particles as well as being trapped by voids (a physical particle wall structure) between particles constituting the composite particles.

After transferring the ink receiving particles, a component of the hydrophilic particles included in the ink receiving particles also functions as a binder resin or a coating resin of a recording material contained in the ink. In particular, a transparent resin may be applied as the component of the hydrophilic particles included in the ink receiving particles.

The addition of a large amount of resin to an ink is necessary for improving the fixity (abrasion resistance) of an ink (for example, a pigment ink) including, for example, an insoluble component or dispersed particulate matter such as a pigment as a recording material; however, the addition of a large amount of a polymer to ink (including the treatment solution) reduces reliability with respect to nozzle clogging or the like of an ink ejecting portion. In contrast, in the exemplary embodiment of the present invention, a resin component of the ink receiving particles may also function as such a resin.

Here, "the void between the particles constituting the composite particles", namely, "the trap structure", is a physical particle wall structure capable of trapping at least liquid. The size of the void may be in the range of from 0.1 μm to 5 μm, or from 0.3 μm to 1 μm, as the largest opening diameter. In particular, the size of the void may be a size capable of trapping a recording material, for example, a pigment having a volume-average particle diameter of 100 nm. A micropore having a maximum opening diameter of less than 50 nm may be present. Voids or capillary tubes may communicate each other inside the particles.

The void size is determined as follows. A scanning electron microscope (SEM) image of the particle surface is read by an image analyzer, voids are detected by binary coding processing, and the size and distribution of the voids are analyzed, whereby the void size is determined.

The trap structure may trap not only the liquid component of the ink components but also the recording material. When the recording material, particularly a pigment, is trapped in the trap structure together with the ink liquid component, the recording material is retained and fixed within the ink receiving particles without being unevenly distributed. The ink liquid component may be ink solvents or dispersion media (vehicle liquids).

The particle configuration of the ink receiving particles according to the exemplary embodiment is described in further detail below. The ink receiving particles according to the exemplary embodiment, as described above, may have a configuration such that the host particles consist of single particles of hydrophilic particles, or a configuration such that the host particles consist of composite particles in which at least hydrophilic particles have been aggregated.

Further, components other than the organic resin (for example, inorganic material, hydrophobic resin, releasing agent (wax) and on the like) may be included in the hydrophilic particles. Further, examples of particles constituting the composite particles other than the liquid absorbing particles include inorganic particles, hydrophobic particles, releasing agent particles (wax particles) and the like.

Further, inorganic particles may be attached to the host particles at the surface of the hydrophilic particles or the composite particles.

Figure 2:
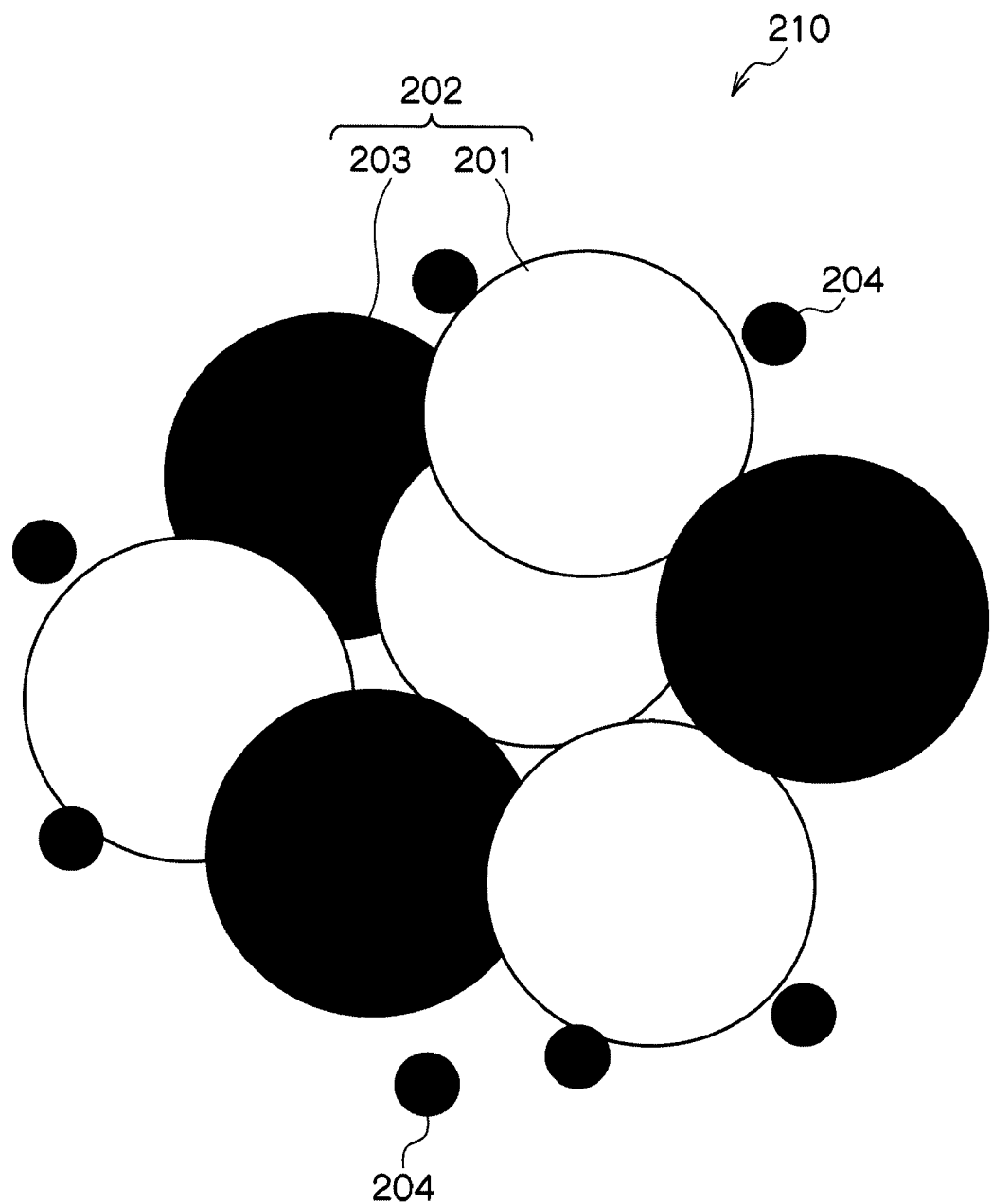
FIG. 2 is a schematic diagram that illustrates another example of ink receiving particles according to an exemplary embodiment.

Examples of a specific configuration of the ink receiving particles according to the exemplary embodiment include a configuration in which an ink receiving particle 200 has a host particle 202 composed of a single particle of a hydrophilic particle 201, and inorganic particles 204 attached to the surface of the host particle 202 (hydrophilic particle 201), as shown in FIG. 1. Another example is a configuration in which an ink receiving particle 210 has a host particle 202 formed of a composite particle composed of hydrophilic particles 201 and other particles 203 (such as inorganic particles, hydrophobic particles including a hydrophobic resin, and wax particles), and inorganic particles 204 attached to the surface of the host particle 202 (composite particle), as shown in FIG. 2. The composite particles have a void structure formed by voids between respective particles. Moreover, these configurations are examples, and the present invention is not limited thereto and, for example, in another configuration, the inorganic particles 204 may not be adhered (not externally added) or, alternatively, the composite particles may be composed only of the hydrophilic particles 201.

The average equivalent spherical diameter of the ink receiving particles as a whole may be in the range of 0.5 to 50 μm (or 1 μm to 30 μm, or 3 μm to 20 μm, or 5 μm to 10 μm).

The average equivalent spherical diameter is determined as follows. The optimum method depends on particle size; however, for example, a method in which the particle diameter is determined by applying the principle of light scattering to a dispersion of the particles in a liquid, or a method in which the particle diameter is determined by image processing of a projected image of the particles, or other methods may be utilized. Examples of methods generally used include a Microtrack UPA method or a Coulter counter method.

When the host particles are composite particles, the weight ratio between the hydrophilic particles and other particles (hydrophilic particles:other particles) is, for example, in a range of 5:1 to 1:10 when the other particles are inorganic particles.

With regard to the particle diameter of host particles, the average equivalent spherical diameter may be from 0.1 to 50 µm, or from 0.5 to 25 µm, or from 1 to 10 µm. When the average equivalent spherical diameter is in this range, high image quality may be achieved. That is, when the average equivalent spherical diameter is large, unevenness occurs in the height direction between a portion where particles are present and a portion where particles are not present on the image, and thus the smoothness of the image may be degraded. On the other hand, when the average equivalent spherical diameter is small, powder becomes more difficult to handle, and it tends to become difficult to supply powder to a given position on a transfer member. As a result, a portion at which hydrophilic particles are not present occurs on the image, and it may become difficult to achieve high speed recording and high image quality. When the ink receiving particles consist of primary particles, the above range of average equivalent spherical diameter may be applied thereto.

When the host particles consist of composite particles, the BET specific surface area thereof ($N_2$) is, for example, in a range of from 1 to 750 $m^2/g$.

When the host particles consist of the composite particles, the composite particles are obtained by, for example, granulating the particles in a semi-sintered state. A semi-sintered state signifies a state in which the particle shape remains to some degree and voids are retained between the particles. With regard to the composite particles, when an ink liquid component is trapped by the trap structure, at least a part of the particles may be dissociated, that is, the composite particles may be dismantled and particles composing these composite particles may be disjoined.

Additionally, regarding the particle diameter of the hydrophilic particles, when the primary particles thereof are used as the host particles, the average equivalent spherical diameter is, for example, within the range of from 0.1 µm to 50 µm, or 0.5 µm to 25 µm, or from 1 µm to 10 µm. Alternatively, when the hydrophilic particles are used in the composite particles, regarding the particle diameter of the hydrophilic particles, the average equivalent spherical diameter is, for example, within the range of from 10 nm to 5 µm, or from 50 nm to 1 µm, or from 50 nm to 500 nm.

Further, the ratio of the hydrophilic particles with respect to the ink receiving particles as a whole is, for example, not less than 75% by weight, or not less than 85% by weight, or within the range of from 90% by weight to 99% by weight.

Respective materials are explained below in further detail. First, the hydrophilic resin will be described. The hydrophilic resin is an organic resin comprising hydrophilic monomer components and one or more hydrophobic monomer components. The hydrophilic monomer components comprise at least a monomer component having a hydroxyl group and a monomer component having a dissociable group. The monomer components included in the organic resin, other than the monomer component having a dissociable group, are selected to have a solubility parameter (SP value) such that an absolute value of a difference between a solubility parameter (SP value) of the organic solvent included in the ink and a solubility parameter (SP value) of monomer components included in the organic resin, other than the monomer component having a dissociable group, is less than 5. Alternatively, the organic solvent included in the ink may be selected such that an absolute value of a difference between a solubility parameter (SP value) of the organic solvent included in the ink and a solubility parameter (SP value) of monomer components included in the organic resin, other than the monomer component having a dissociable group, is less than 5.

The absolute value of a difference between a SP value of the organic solvent included in the ink and a SP value of monomer components included in the hydrophilic resin, other than the monomer component having a dissociable group, is less than 5, which may be from 0.1 to less than 4, or may be from 0.1 to less than 2. When the absolute value of the difference is within the above range, the affinity between the organic solvent included in the ink and the hydrophilic resin included in the ink receiving particles may be improved. As a result, the liquid absorbing property of the ink receiving particles may be improved.

Here, the SP value of the monomer components included in the hydrophilic resin, other than the monomer component having a dissociable group, means a mixed SP value of the monomer component having a hydroxyl group, the one or more hydrophobic monomer components, and optionally other monomer components (excluding a monomer component having a dissociable group). When plural organic solvents are used in the ink, the SP value of the organic solvent included in the ink means a mixed SP value of these solvents.

The monomer component having a hydroxyl group included in the hydrophilic resin may be selected to have a SP value such that the absolute value of a difference between the solubility parameter (SP value) of the organic solvent included in the ink and a solubility parameter (SP value) of the monomer component having a hydroxyl group included in the hydrophilic resin is less than 2. Alternatively, the organic solvent included in the ink may be selected such that the absolute value of a difference between the solubility parameter (SP value) of the organic solvent included in the ink and a solubility parameter (SP value) of the monomer component having a hydroxyl group included in the hydrophilic resin is less than 2.

The absolute value of a difference between the solubility parameter (SP value) of the organic solvent included in the ink and a solubility parameter (SP value) of the monomer component having a hydroxyl group included in the hydrophilic resin may be less than 2, or from 0.1 to less than 1.5, or from 0.1 to less than 1.0. When the absolute value of the difference is within the above range, the affinity between the organic solvent included in the ink and the hydrophilic resin included in the ink receiving particles may further effectively be improved. As a result, the liquid absorbing property of the ink receiving particles may further be improved.

The solubility parameter (SP value) is a value obtained by calculating the following formula by Fedors, in which the SP value is determined from the vaporization energy ($\Delta ei$) and the molar volume ($\Delta vi$) of the atom or the atom group of the chemical structure. The SP value of the monomer component is calculated as a SP value of the compound (monomer) from which the monomer component is derived. The mixed solubility parameter (mixed SP value) of the components (monomer components or organic solvents) is a weighted average value of the SP values, which is calculated by using the molar ratios of the respective components. The same applies to the following descriptions.

Formula: SP value=$(\Sigma \Delta ei / \Sigma \Delta vi)^{1/2}$

The hydrophilic resin is an organic resin comprising hydrophilic monomer components and one or more hydrophobic monomer components, wherein a content ratio of the hydrophilic monomer components with respect to the total amount of monomer components included in the organic resin may be from 10 mol % (or about 10 mol %) to less than 100 mol %, or from 25 mol % to 95 mol %, or from 30 mol % to 90 mol %. When this ratio is within the above range, the liquid absorbing property of the ink receiving particles may be improved.

The hydrophilic monomer components comprise at least a monomer component having a hydroxyl group and a monomer component having a dissociable group, wherein a content ratio of the monomer component having a hydroxyl group with respect to the total amount of monomer components included in the hydrophilic resin may be from 1 mol % (or about 1 mol %) to 75 mol % (or about 75 mol %). This ratio may be from 1 mol % to 45 mol %, or from 1 mol % to 30 mol %, or from 5 mol % to 20 mol %, when the ink receiving particles are supplied by a charging method. Alternatively, this ratio may be from 10 mol % to 60 mol %, or from 20 mol % to 50 mol %, when the ink receiving particles are supplied by an adhering method. When this ratio is within the above range, a supplying defect may be suppressed, and the affinity between the organic solvent included in the ink and the hydrophilic resin included in the ink receiving particles may be further effectively improved. As a result, the liquid absorbing property of the ink receiving particles may be improved.

The ratio of each of the monomer components may be determined in the following manner. First, the composition of the organic component is determined by analytical methods such as a mass spectrometry, NMR (nuclear magnetic resonance), IR (infrared absorption spectrometry), and the like. Then, the acid value and the base value of the organic component are measured in accordance with JIS K0070 or JIS K2501, the disclosures of which are incorporated by reference herein. The ratio of each of the monomer components may be calculated from the composition, acid value, and base value of the organic component.

The hydrophilic resin may include a copolymer obtained from hydrophilic monomers and hydrophobic monomers. The hydrophilic monomers include a monomer having a hydroxyl group, and a monomer having a dissociable group. Further, the hydrophilic resin may include a graft copolymer or a block copolymer in which a starting unit such as a polymer/oligomer structure is copolymerized with another unit.

Examples of the monomer having a hydroxyl group (a hydrophilic monomer) include hydroxymethyl(meth)acrylate, 2-hydroxyethyl(meth)acrylate, 2-hydroxypropyl(meth)acrylate, 4-hydroxybutyl(meth)acrylate, 3-chloro-2-hydroxypropyl methacrylate, di-(ethyleneglycol)maleate, di-(ethyleneglycol)itaconate, 2-hydroxyethyl maleate, bis(2-hydroxyethyl)maleate, 2-hydroxyethylmethyl fumarate, ethyleneglycol mono(meth)acrylate, diethyleneglycol mono(meth)acrylate, 1,3-butyleneglycol mono(meth)acrylate, 1,6-hexanediol mono(meth)acrylate, neopentylglycol mono(meth)acrylate, trimethylolpropane mono(meth)acrylate, tetramethylolmethane mono(meth)acrylate, pentaerythritol mono(meth)acrylate, polyethyleneglycol mono(meth)acrylate, and hydroxyethyl acrylamide.

Examples of the monomer having a dissociable group (hydrophilic monomer) include a monomer having, as a dissociable group, an ethylene oxide group, a carboxylic acid group, a sulfonic acid group, or a substituted or unsubstituted amino group. When the ink receiving particles are positively charged, the monomer may be a monomer having a (substituted) amino group or a (substituted) pyridine group. When the ink receiving particles are negatively charged, the monomer may be a monomer having an organic acid group such as a carboxylic acid group or a sulfonic acid group. Specific examples thereof include a monomer having an -EO unit (ethylene oxide group), —COOM (where M is, for example, hydrogen, an alkali metal such as Na, Li and K, ammonia, or an organic amine), —SO$_3$M (where M is, for example, hydrogen, an alkali metal such as Na, Li and K, ammonia, or an organic amine), —NR$_3$ (where R is, for example, H, alkyl or phenyl), and —NR$_4$X (where R is, for example, H, alkyl or phenyl, and X is, for example, halogen, sulfate group, an acid anion such as carboxylic acid, or BF$_4$).

Specific examples of the monomer having a dissociable group (hydrophilic monomer) include acrylamide, acrylic acid, methacrylic acid, unsaturated carboxylic acid, crotonic acid and maleic acid. A carboxylic acid may be particularly advantageous in terms of storage stability because it tends not to dissociate due to humidity in the air but dissociates in ink (a slightly alkaline liquid) when it is not neutralized (when not having a salt structure). Further, carboxylic acid may be advantageous in terms of fixing property because it crosslinks (pseudo-crosslinks) via ions in ink and the entire system (ink+ink receiving particles) is easily fixed.

Examples of a hydrophilic unit or monomer to be used as a hydrophilic monomer component include cellulose derivatives such as cellulose, ethyl cellulose and carboxymethyl cellulose, starch derivatives, monosaccharides/polysaccharides derivatives, polymerizable carboxylic acids and (partially) neutralized salts thereof such as vinyl sulfonic acid, styrenesulfonic acid, acrylic acid, methacrylic acid and maleic acid (anhydride), vinyl alcohols, derivatives and onium salts thereof such as vinylpyrrolidone, vinylpyridine, amino(meth)acrylate and dimethylamino(meth)acrylate, amides such as acrylamide and isopropylacrylamide, polyethylene oxide chain-containing vinyl compounds, hydroxyl group-containing vinyl compounds, and polyesters composed of multifunctional carboxylic acid and polyhydric alcohol, particularly, branched polyester containing tri- or higher functional acid such as trimellitic acid as a component and containing terminal carboxylic acid and hydroxyl group in large quantities, and polyester containing a polyethylene glycol structure.

The hydrophobic monomers may be monomers having a hydrophobic group, and specific examples include olefin (ethylene, butadiene, or the like), styrene, α-methyl styrene, α-ethyl styrene, methyl methacrylate, ethyl methacrylate, butyl methacrylate, acrylonitrile, vinyl acetate, methyl acrylate, ethyl acrylate, butyl acrylate, lauryl methacrylate, and the like. Examples of a hydrophobic unit or monomer include styrene derivatives such as styrene, α-methyl styrene, vinyl toluene; vinyl cyclohexane, vinyl naphthalene, vinyl naphthalene derivatives, alkyl acrylate, phenyl acrylate, alkyl methacrylate, phenyl methacrylate, cycloalkyl methacrylate, alkyl crotonate, dialkyl itaconate, dialkyl maleate, polyethylene, ethylene/vinyl acetate, polyolefines such as polypropylene, or the like; and derivatives thereof.

Specific examples of the hydrophilic resin which is a copolymer of hydrophilic monomers and a hydrophobic monomer include a styrene/2-ethylhexyl(meth)acrylate/hydroxypropyl(meth)acrylate/(meth)acrylic acid copolymer, a styrene/2-ethylhexyl(meth)acrylate/hydroxypropyl(meth)acrylate/maleic acid copolymer, a styrene/hydroxybutyl(meth)acrylate/(meth)acrylic acid copolymer, and a styrene/hydroxybutyl(meth)acrylate/maleic acid copolymer.

The hydrophilic resin may include a substituted or unsubstituted amino group, or a substituted or unsubstituted pyridine group. These groups exert a bactericidal effect and an interaction with a recording material (such as pigments and dyes) having anionic groups.

Here, in the hydrophilic resin, the molar ratio (hydrophilic monomer:hydrophobic monomer) between a hydrophilic monomer and a hydrophobic monomer is, for example, 5:95 to 70:30.

The hydrophilic resin may soften and contribute to fixability for the reason that an ink liquid component (such as water or aqueous solvent) absorbed therein functions as a plasticizer of the resin (polymer).

The hydrophilic resin may be a weak liquid absorbing resin. This weak liquid absorbing resin signifies a liquid absorbing resin capable of absorbing liquid in an amount of from several percent (approximately 5%) to several hundred percent (approximately 500%), or from about 5% to 100%, with respect to resin weight when, for example, absorbing water as the liquid.

When the liquid absorbing property of the hydrophilic resin (weak liquid absorbing resin) is less than 5%, the ink holding ability of the ink receiving particles may degrade, and when it exceeds 500%, the moisture absorption of the ink receiving particles may be activated, and there are cases when stability with respect to variation in ambient conditions decreases.

The hydrophilic resin may be a crosslinked resin, or a partially crosslinked resin. The crosslinked resin or partially crosslinked resin may be obtained by copolymerization or chemical reaction of a crosslinking agent and the above described copolymer.

The hydrophilic resin may be a resin capable of being ion crosslinked by ions supplied from ink. Specifically, units containing a carboxylic acid may be made present in the hydrophilic resin, such as a copolymer containing a carboxylic acid such as (meth)acrylic acid or maleic acid, or a (branched) polyester having a carboxylic acid. Ion crosslinking and an acid-base interaction or the like are caused between the carboxylic acid in the resin, and an alkali metal cation, alkaline earth metal cation, organic amine, onium cation or the like supplied from liquid such as water-based ink.

The hydrophilic resin may have a straight-chain structure but may have a branch structure. The organic resin may be either not crosslinked or low crosslinked. Further, the resin may be a random copolymer or block copolymer with a straight-chain structure, but a polymer with a branch structure (including a random copolymer, block copolymer and graft copolymer with a branch structure) may be used. In the case, for example, of polyester synthesized by polycondensation, terminal groups may be increased with a branch structure. One general method for preparing this branch structure is to add a crosslinking agent such as divinylbenzene or di(meth)acrylates at the time of synthesis (for example, addition of less than 1%) or to add large quantities of an initiator together with the crosslinking agent.

In the hydrophilic resin, a charge control agent for electrophotographic toner may further be added to the resin, such as low-molecular quaternary ammonium salts, organic borates, or salt compounds of salicylic acid derivatives.

The hydrophilic resin may be an amorphous resin, and the glass transition temperature (Tg) thereof is, for example, from 40° C. to 90° C. The glass transition temperature (and melting point) is determined from the major maximum peak measured in accordance with ASTMD 3418-8. The major maximum peak may be measured by using a DSC-7 (manufactured by Perkin Elmer). In this apparatus, the temperature of the detection unit is corrected using the melting point of indium and zinc, and the calorimetric value is corrected using the fusion heat of indium. For the sample, an aluminum pan is used, and for the control, an empty pan is set. Measurement is conducted at a temperature elevation rate of 10° C./min.

The weight-average molecular weight of the hydrophilic resin is, for example, from 5,000 to 100,000; or from 7,500 to 70,000; or from 10,000 to 50,000.

The weight-average molecular weight is measured under the following conditions. For example, the GPC apparatus used is an HLC-8120GPC, SC-8020 (manufactured by TOSOH CORPORATION), two pieces of TSK gel, Super HM-H (manufactured by TOSOH CORPORATION, 6.0 mm ID×15 cm) are used as the column, and the eluent is THF (tetrahydrofuran). The experiment is carried out under the following experimental conditions: a sample concentration of 0.5%, flow rate of 0.6 ml/min, sample injection amount of 10 μl, measuring temperature of 40° C., and using an IR detector. A calibration curve is prepared from ten samples of polystyrene standard samples TSK standard manufactured by TOSOH CORPORATION: A-500, F-1, F-10, F-80, F-380, A-2500, F-4, F-40, F-128 and F-700.

The acid value of the hydrophilic resin may be from 50 mgKOH/g to 500 mgKOH/g, or from 100 mgKOH/g to 300 mgKOH/g as expressed by carboxylic acid groups (—COOH). The acid value as expressed by carboxylic acid groups (—COOH) may be measured as follows.

The acid value is measured using a neutralization titration method in accordance with JIS K 0070. That is, an appropriate amount of sample is prepared and, to this sample, 100 ml of solvent (diethyl ether/ethanol mixture) is added together with several droplets of indicator (phenolphthalein solution). The resulting mixture is shaken and mixed sufficiently in a water bath until the sample is dissolved. The solution is titrated with 0.1 mol/L of potassium hydroxide ethanol solution, and an end point is determined when a pale scarlet color of the indicator continues for 30 seconds. Acid value A is calculated by the following equation:

$$A = (B \times f \times 5.611)/S,$$

where S (g) represents a sampling amount, B (ml) represents the amount of 0.1 mol/l potassium hydroxide ethanol solution used for the titration, and f represents a factor of 0.1 mol/l potassium hydroxide ethanol solution.

The hydrophilic resin may be synthesized by various reaction methods such as bulk polymerization, solution polymerization, suspension polymerization and emulsion polymerization. The obtained hydrophilic resin may be pulverized or granulated (complexed) by various methods, such as spray drying in solution state, and bead milling or jet milling in dry state.

Next, the inorganic particles used in the composite particles together with the hydrophilic particles, and the inorganic particles attached to the host particles are described. Both nonporous particles and porous particles may be used as the inorganic particles. Examples of the inorganic particles include colorless, pale or white particles (such as colloidal silica, alumina, calcium carbonate, zinc oxide, titanium oxide and tin oxide). Surface treatment (such as partial hydrophobizing treatment and specific functional group introduction treatment) may be performed for these inorganic particles. For example, in the case of silica, an alkyl group is introduced by treating the hydroxyl group of silica with a silylation agent such as trimethylchlorosilane or tert-butyldimethylchlorosilane. Dehydrochlorination is caused by the silylation agent and the reaction is promoted. Here, the addition of an amine may also change hydrochloric acid into hydrochloride to promote the reaction. The control may be performed by controlling the treatment amount and treatment conditions of silane coupling agents having an alkyl group or phenyl group as a hydrophobic group, and of coupling agents of titanate, zirconate or the like. Surface treatment with fatty alcohols, higher fatty acids and derivatives thereof may also be performed. Surface treatment may also be performed with coupling agents having a cationic functional group such as silane coupling agents having (substituted) amino group or quaternary ammonium salt structure, coupling agents having a fluorine functional group such as fluorosilane, and coupling agents having an anionic functional group such as carboxylic acid. These inorganic particles may be contained inside the hydrophilic particles; that is, internally added.

The particle diameter of the inorganic particles used in the composite particles is, for example, 10 nm to 30 μm, or 50 nm to 10 μm, or 0.1 μm to 5 μm in average equivalent spherical diameter. Further, the particle diameter of the inorganic particles attached to the host particles is, for example, 10 nm to 1 μm, or 10 nm to 0.1 μm, or 10 nm to 0.05 μm in average equivalent spherical diameter.

Other constituent materials shall be explained below.

The ink receiving particles may include a hydrophobic resin. The hydrophobic resin may be included in the hydrophilic particles together with the hydrophilic resin. Hydrophobic particles containing hydrophobic resin may be included in the composite particles together with the hydrophilic particles. Additionally, the hydrophobic resin may have a polar group and may be a resin in which the content ratio of the polar monomer with respect to the total amount of the monomer components is from 0% by mol to less than 10% by mol.

A releasing agent (wax) may be included in the ink receiving particles. The releasing agent may be included in the hydrophilic particles together with the hydrophilic resin. Releasing agent particles (wax particles) may be included in the composite particles together with the hydrophilic particles.

Examples of the releasing agent include low molecular polyolefins such as polyethylene, polypropylene and polybutene; silicones having a softening point caused by heating; fatty acid amides such as oleic amide, erucic amide, ricinoleic amide and stearic amide; vegetable waxes such as carnauba wax, rice wax, candelilla wax, Japan wax and jojoba oil; animal waxes such as beeswax; mineral or petroleum waxes such as montan wax, ozokerite, ceresin, paraffin wax, microcrystalline wax and Fischer-Tropsch wax; and modifications thereof. Among these, crystalline compounds may be used.

The ink receiving particles according to the exemplary embodiment as described above may be used singly or in combination with a carrier. For example, a carrier used for a developing agent for toner for electrophotography may be used as the carrier.

(Ink)

Hereinafter, details of the ink will be described. The ink includes a recording material, an organic solvent, and water, and may optionally include other additives. The organic solvent included in the ink is selected to have a SP value such that the absolute value of a difference between a SP value of the organic solvent included in the ink and a SP value of the monomer components included in the hydrophilic resin, other than the monomer component having a dissociable group, is within the above described range. The organic solvent included in the ink may be selected to have a SP value such that the absolute value of a difference between the SP value of the organic solvent included in the ink and a SP value of the monomer component having a hydroxyl group included in the hydrophilic resin is within the above described range.

Details of the recording material will now be explained. A colorant may be used as the recording material, which may be either a dye or a pigment, but may be a pigment. Either an organic pigment or an inorganic pigment may be used as the pigment. Examples of the black pigments include carbon black pigments such as furnace black, lamp black, acetylene black, and channel black. In addition to black and three primary colors of cyan, magenta and yellow, other pigments of specific colors such as red, green, blue, brown or white, metal glossy pigments of gold, silver or the like, body pigments of colorless or pale color, plastic pigments, or the like. A pigment newly synthesized for the invention may also be used.

Further, particles composed of a core of silica, alumina, polymer bead or the like on which a dye or a pigment is fixed, an insoluble lake compound of a dye, a colored emulsion, a colored latex or the like may also be used as a pigment.

Specific examples of the black pigments used in the present invention include RAVEN 7000, RAVEN 5750, RAVEN 5250, RAVEN 5000 ULTRA II, RAVEN 3500, RAVEN 2000, RAVEN 1500, RAVEN 1250, RAVEN 1200, RAVEN 1190 ULTRA II, RAVEN 1170, RAVEN 1255, RAVEN 1080 and RAVEN 1060 (manufactured by Columbian Carbon Company); REGAL 400R, REGAL 330R, REGAL 660R, MOGUL L, Black Pearls L, MONARCH 700, MONARCH 800, MONARCH 880, MONARCH 900, MONARCH 1000, MONARCH 1100, MONARCH 1300 and MONARCH 1400 (manufactured by Cabot Corporation); Color Black FW1, Color Black FW2, Color Black FW2V, Color Black 18, Color Black FW200, Color Black S150, Color Black S160, Color Black S170, PRINTEX 35, PRINTEX U, PRINTEX V, PRINTEX 140U, PRINTEX 140V, Special Black 6, Special Black 5, Special Black 4A and Special Black 4 (manufactured by Degussa Co.); and No. 25, No. 33, No. 40, No. 47, No. 52, No. 900, No. 2300, MCF-88, MA 600, MA 7, MA 8 and MA 100 (manufactured by Mitsubishi Chemical Co., Ltd.). However, the pigments are not restricted thereto.

Specific examples of the cyan color pigments include C.I. Pigment Blue-1, -2, -3, -15, -15:1, -15:2, -15:3, -15:4, -16, -22 and -60, but are not restricted thereto Specific examples of the magenta color pigments include C.I. Pigment Red-5, -7, -12, -48, -48:1, -57, -112, -122, -123, -146, -168, -177, -184, -202, and C.I. Pigment Violet-19, but are not restricted thereto.

Specific examples of the yellow color pigments include C.I. Pigment Yellow-1, -2, -3, -12, -13, -14, -16, -17, -73, -74, -75, -83, -93, -95, -97, -98, -114, 128, -129, -138, -151, -154 and -180, but are not restricted thereto.

Here, in the case where a pigment is used as the colorant, a pigment dispersing agent may be used in combination. Examples of usable pigment dispersing agents include a polymer dispersing agent, an anionic surfactant, a cationic surfactant, an amphoteric surfactant and a nonionic surfactant.

As the polymer dispersing agent, a polymer having both of a hydrophilic structure part and a hydrophobic structure part may be used. As the polymer having a hydrophilic structure part and a hydrophobic structure part, a condensation-type polymer and an addition polymer may be used. Examples of the condensation-type polymers include known polyester-based dispersing agents. Examples of the addition polymers include addition polymers of monomers having an α,β-ethylenically unsaturated group. By copolymerizing a monomer having an α,β-ethylenically unsaturated group and a hydrophilic group and a monomer having an α,β-ethylenically unsaturated group and a hydrophobic group, a desired polymer dispersing agent may be obtained. Further, a homopolymer of monomers having an α,β-ethylenically unsaturated group and a hydrophilic group may also be used.

Examples of the monomers having an α,β-ethylenically unsaturated group and a hydrophilic group include monomers having a carboxyl group, a sulfonic acid group, a hydroxyl group, a phosphoric acid group or the like; specifically, acrylic acid, methacrylic acid, crotonic acid, itaconic acid, itaconic acid monoester, maleic acid, maleic acid monoester, fumaric acid, fumaric acid monoester, vinyl sulfonic acid, styrene sulfonic acid, sulfonated vinyl naphthalene, vinyl alcohol, acrylamide, methacryloxy ethyl phosphate, bis (methacryloxy ethyl) phosphate, methacryloxy ethyl phenyl acid phosphate, ethylene glycol dimethacrylate, diethylene glycol dimethacrylate and the like.

Examples of the monomer having an α,β-ethylenically unsaturated group and a hydrophobic group include styrene derivatives such as styrene, α-methylstyrene and vinyl toluene, vinyl cyclohexane, vinyl naphthalene, vinyl naphthalene derivatives, alkyl acrylate, alkyl methacrylate, phenyl methacrylate, cycloalkyl methacrylate, alkyl crotonate, dialkyl itaconate, dialkyl maleate and the like.

Specific examples of the copolymers used as a polymer dispersant include a styrene-styrene sulfonic acid copolymer, a styrene-maleic acid copolymer, a styrene-methacrylic acid copolymer, a styrene-acrylic acid copolymer, a vinylnaphthalene-maleic acid copolymer, a vinylnaphthalene-methacrylic acid copolymer, a vinylnaphthalene-acrylic acid copolymer, an alkyl acrylate-acrylic acid copolymer, an alkyl methacrylate-methacrylic acid copolymer, a styrene-alkyl methacrylate-methacrylic acid copolymer, a styrene-alkyl acrylate-acrylic acid copolymer, a styrene-phenyl methacrylate-methacrylic acid copolymer, and a styrene-cyclohexyl methacrylate-methacrylic acid copolymer. A monomer having a polyoxyethylene group or a hydroxyl group may also be copolymerized with the above polymers.

From a viewpoint of suppressing inhibition of liquid absorbing of the ink receiving particles, the above-mentioned polymer dispersing agent may have a relatively small molecular weight such as a weight average molecular weight of from 1,000 to 250,000.

These pigment dispersing agents may be used alone or in combination of two or more kinds. Although the addition amount of the pigment dispersing agent varies largely depending on the types of the pigments, the addition amount thereof is generally in the range of from 0.1% by weight to 100% by weight with respect to the amount of the pigment.

A pigment capable of self-dispersing in water may also be used as a colorant. A pigment capable of self-dispersing in water may suppress inhibition of liquid absorbing of the ink receiving particles. The pigment capable of self-dispersing in water used in the present invention refers to the pigment that has a large number of water-solubilizing groups on the surface of the pigment and is capable of dispersing in water without the presence of a polymer dispersant. The pigment capable of self-dispersing in water may be obtained by subjecting a common so-called pigment to surface modification treatments such as an acid or a base treatment, a coupling agent treatment, a polymer graft treatment, a plasma treatment or a redox treatment.

In addition to the above surface-modified pigments, commercially available pigments such as CAB-O-JET-200, CAB-O-JET-300, CAB-O-JET-250, CAB-O-JET-260, CAB-O-JET-270, IJX-444 and IJX-55 (manufactured by Cabot Corporation), and MICROJET BLACK CW-1 and CW-2 (manufactured by Orient Chemical Industries, Ltd.) may also be used as a pigment capable of self-dispersing in water.

The above self-dispersing pigments may be a pigment having at least a functional group of sulfonic acid, a sulfonate, a carboxylic acid, or a carboxylate on the surface thereof, or a pigment having a functional group of at least a carboxylic acid or a carboxylate on the surface thereof.

A pigment coated with a resin may also be used as the colorant. Such a pigment is called as a microcapsule pigment, which include commercially available microcapsule pigments manufactured by Dainippon Ink & Chemicals, Inc. and Toyo Ink MFG Co., Ltd. as well as the microcapsule pigments prepared for use in the invention.

A resin dispersing-type pigment composed of the above pigment to which a polymer substance is adsorbed or chemically bonded may also be used.

Other examples of the recording materials include dyes such as a hydrophilic anionic dye, direct dye, cationic dye, reactive dye, high molecular dye and oil-soluble dye, wax powder, resin powder or emulsions colored with a dye, fluorescent dye or fluorescent pigment, infrared absorber, ultraviolet absorber, magnetic materials such as ferromagnetic materials represented by ferrite, magnetite and others, semiconductors and photo catalysts represented by titanium oxide, zinc oxide and others, and other organic and inorganic particles of an electronic material.

The content (concentration) of the recording material is, for example, from 1% by weight to 20% by weight (or from 1% by weight to 15% by weight, or from 3% by weight to 10% by weight) with respect to the amount of the ink.

The volume average particle diameter of the colorant is, for example, from 10 nm to 300 nm.

The volume average particle diameter of the recording material refers to the particle diameter of the recording material itself, or when an additive such as a dispersing agent is attached to the recording material, the particle diameter including the attached additive. In the invention, as the device for measurement of the volume average particle diameter, MICROTRUC UPA particle size analysis meter 9340 (produced by Leeds & Northrup Corp.) is used. The measurement is carried out according to the predetermined method with 4 ml of an ink put into a measuring cell. As the parameters to input for the measurement, the viscosity of the ink and the density of the recording material are used as the viscosity and the density of dispersed particles, respectively.

Next, an organic solvent will be mentioned. As an organic solvent, water soluble organic solvents such as polyhydric alcohols, polyhydric alcohol derivatives, nitrogen-containing solvents, alcohols, sulfur-containing solvents, and the like may be used.

Specific examples of the polyhydric alcohols include ethylene glycol, diethylene glycol, propylene glycol, butylene glycol, triethylene glycol, 1,5-pentane diol, 1,2-hexane diol, 1,2,6-hexane triol, glycerin, trimethylolpropane and sugar alcohols such as xylitol; and saccharides such as xylose, glucose and galactose.

Specific examples of the polyhydric alcohol derivatives include ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, and the ethylene oxide adduct of diglycerol.

Specific examples of the nitrogen-containing solvents include pyrrolidone, N-methyl-2-pyrrolidone, cyclohexyl pyrrolidone, and triethanol amine. Specific examples of the alcohols include ethanol, isopropyl alcohol, butyl alcohol and benzyl alcohol. Specific examples of the sulfur-containing solvents include thiodiethanol, thiodiglycerol, sulfolane, and dimethyl sulfoxide.

Propylene carbonates, ethylene carbonates, or the like may also be used as the water-soluble organic solvent.

The water-soluble organic solvent may be used as one or more kinds thereof. The content of the water-soluble organic solvent to be used is, for example, from 1% by weight to 70% by weight.

Next, water will be explained. As the water, ion exchange water, ultra pure water, distilled water or ultrafiltrated water may be used in order to prevent introduction of impurities.

Next, other additives will be explained. A surfactant may be added to the ink.

As the surfactants, various kinds of anionic surfactants, nonionic surfactants, cationic surfactants, amphoteric surfactants and the like may be used, and the anionic surfactants and the nonionic surfactants may be used.

Specific examples of the anionic surfactants include an alkylbenzenesulfonate, alkylphenylsulfonate, alkylnaphthalenesulfonate, higher fatty acid salt, sulfuric acid ester salt of higher fatty acid ester, sulfonic acid salt of higher fatty acid ester, sulfuric acid ester salt and sulfonic acid salt of higher alcohol ether, higher alkylsulfosuccinate, polyoxyethylene alkyl ethercarboxylate, polyoxyethylene alkyl ethersulfate, alkylphosphate and polyoxyethylene alkyl etherphosphate, and dodecylbenzenesulfonate, isopropylnaphthalenesulfonate, monobutylphenylphenol monosulfonate, monobutylbiphenylsulfonate, monobutylbiphenylsulfonate and dibutylphenylphenoldisulfonate may be used.

Specific examples of the nonionic surfactants include polyoxyethylene alkyl ether, polyoxyethylene alkylphenyl ether, polyoxyethylene fatty acid ester, sorbitan fatty acid ester, polyoxyethylene sorbitan fatty acid ester, polyoxyethylene sorbitol fatty acid ester, glycerol fatty acid ester, polyoxyethyleneglycerol fatty acid ester, polyglycerol fatty acid ester, sucrose fatty acid ester, polyoxyethylene alkylamine, polyoxyethylene fatty acid amide, alkylalkanol amide, polyethyleneglycol polypropyleneglycol block copolymer, acetylene glycol and polyoxyethylene adduct of acetylene glycol, and polyoxyethylene nonyl phenyl ether, polyoxyethylene octyl phenyl ether, polyoxyethylene dodecyl phenyl ether, polyoxyethylene alkyl ether, polyoxyethylene fatty acid ester, sorbitan fatty acid ester, polyoxyethylene sorbitan fatty acid ester, fatty acid alkylol amide, polyethyleneglycol polypropyleneglycol block copolymer, acetylene glycol and polyoxyethylene adduct of acetylene glycol may be used.

In addition, silicone surfactants such as polysiloxane oxyethylene adducts, fluorine surfactants such as perfluoroalkyl carboxylate, perfluoroalkyl sulfonate and oxyethylene perfluoroalkyl ether, and biosurfactants such as spiculisporic acids, rhamnolipid and lysolecithin.

These surfactants may be used alone or in combination. The hydrophilicity/hydrophobicity balance (HLB) of the surfactant may be in the range of 3 to 20 in view of dissolvability or the like.

The amount of the surfactant to be added may be from 0.001% by weight to 5% by weight, or from 0.01% by weight to 3% by weight.

Further, other various additives may be added to the ink, such as a permeating agent for adjusting permeating property of the ink, compounds such as polyethylene imine, polyamines, polyvinyl pyrrolidone, polyethylene glycol, ethyl cellulose and carboxy methyl cellulose, for controlling ink ejection property, and alkali metal compounds such as potassium hydroxide, sodium hydroxide and lithium hydroxide for adjusting conductivity and pH of the ink. As needed, a pH buffer, an antioxidant, a mildew preventing agent, a viscosity adjusting agent, a conductive agent, an ultraviolet ray absorbing agent, a chelating agent or the like may also be added.

Next, the properties of the ink will be explained. First, the pH of the ink is, for example, may be not less than 7, or in the range of from 7 to 11, or in the range of from 8 to 10.

Here, the value of the pH of the ink as measured under ambient conditions of temperature of 23±0.5° C. and humidity of 55±5% R.H., using a pH/conductivity meter (MPC 227; manufactured by Mettler-Toledo International Inc.), is adopted.

The surface tension of the ink is, for example, 20 to 40 mN/m (or from 25 to 35 mN/m).

Here, the value as the surface tension is measured under the conditions of 23° C. and 55% RH by the use of a Willhermy type surface tensiometer (produced by Kyowa Interface Science Co., Ltd.) is used.

The ink viscosity may be, for example, from 2 mPa·s to 20 mPa·s (or from 3 mPa·s to 15 mPa·s, or about 10 mPa·s).

The viscosity here is determined as a value measured by using RHEOMAT 115 (manufactured by Contraves), at a measuring temperature of 23° C. and a shearing speed of 1400 $s^{-1}$.

The ink is not particularly limited to the above composition, and may include other functional materials than the recording material, such as a liquid crystal material or an electronic material.

[Ink Receiving Particle Storage Cartridge]

The ink receiving particle storage cartridge according to the exemplary embodiment may be attached to and detached from a recording apparatus, and is a member that stores the ink receiving particles according to the exemplary embodiment described above, and that supplies the ink receiving particles to a particle application device (particle supply device) of the recording apparatus.

Figure 3:
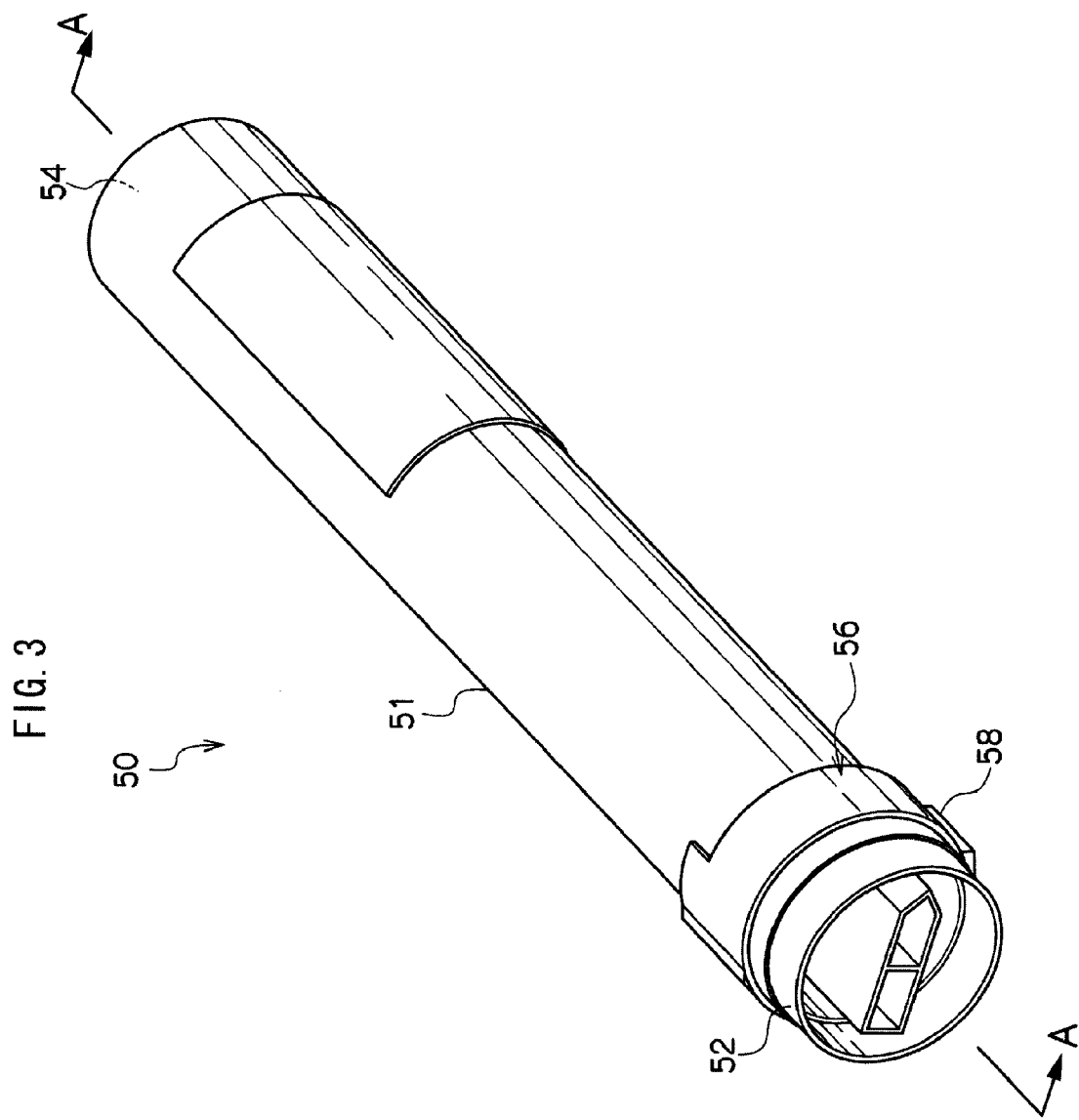
FIG. 3 illustrates a perspective view of an ink receiving particle storage cartridge according to an exemplary embodiment.
Figure 4:
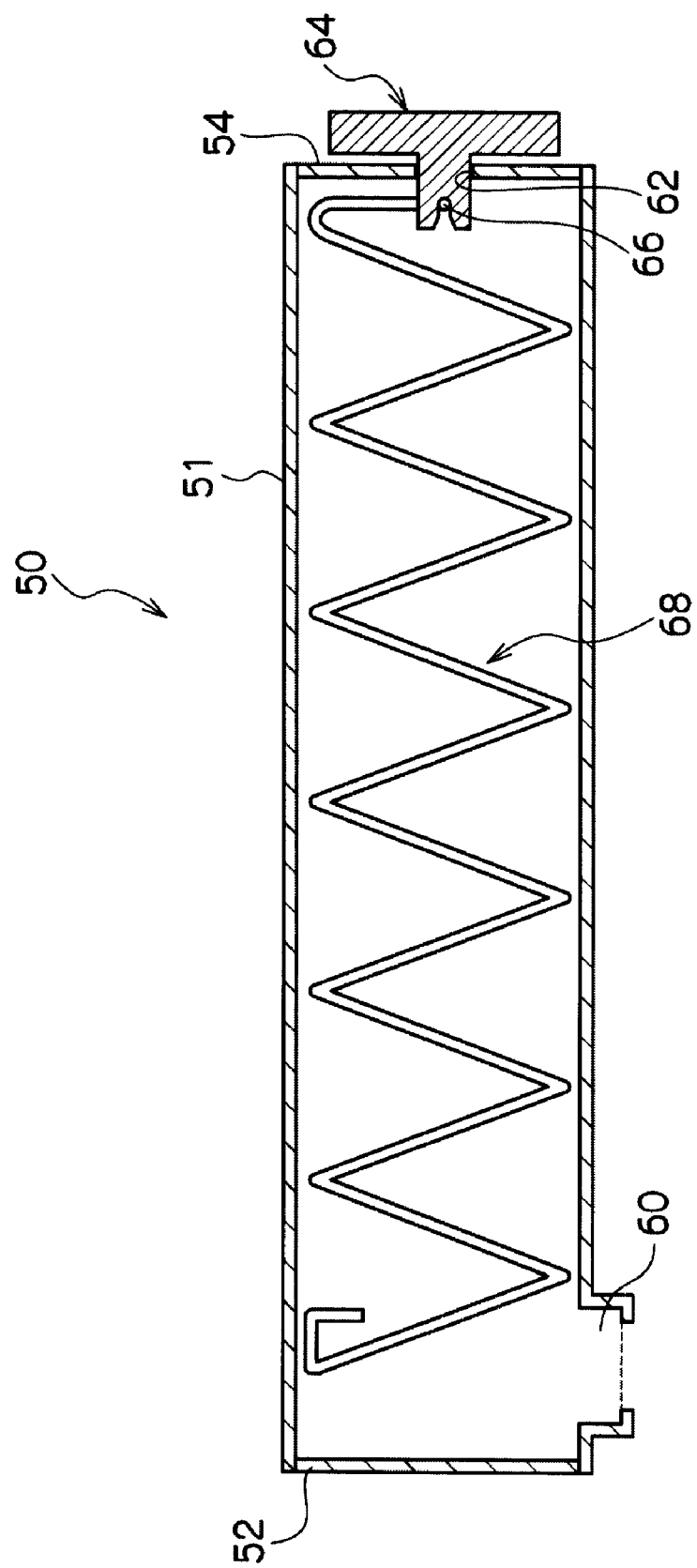
FIG. 4 illustrates a sectional view taken along line A-A in FIG. 3.

An exemplary embodiment of the ink receiving particle storage cartridge according to the exemplary embodiment will be described below with reference to drawings. FIG. 3 is a perspective view showing the ink receiving particle storage cartridge according to an exemplary embodiment. FIG. 4 is a sectional view along A-A in FIG. 3.

As shown in FIG. 3 and FIG. 4, an ink receiving particle storage cartridge 50 according to the exemplary embodiment is composed of a cylindrical particle storage cartridge main body 51, and side wall portions 52, 54 fitted to either end of the particle storage cartridge main body 51.

A discharge port 60 is provided at a peripheral surface at one end side of the particle storage cartridge main body 51, for feeding ink receiving particles to the particle application device (particle supply device, not shown) of the recording apparatus. Further, a belt portion 56 is slidably attached to the particle storage cartridge main body 51. This belt portion 56 has a housing unit 58 that accommodates the discharge port 60 at the outer side of the discharge port 60.

Therefore, when the particle storage cartridge 50 is not loaded in the recording apparatus (or immediately after it is loaded), the housing unit 58 accommodates the discharge port 60 so that the ink receiving particles inside the particle storage cartridge main body 51 do not leak from the discharge port 60.

A hole 62 is provided at the central portion of the side wall portion 54 at the other end side of the particle storage cartridge main body 51. A joining part 66 of a coupling part 64 penetrates from the hole 62 of the side wall portion 54 into the inside of the particle storage cartridge main body 51. As a result, the coupling part 64 is freely rotatable with respect to the side wall portion 54.

An agitator 68 is disposed inside the particle storage cartridge main body 51. The agitator 68 is a metal wire member made of, for example, stainless steel (SUS304WP), with a circular cross section, and formed in a spiral shape. Further, one end part of the agitator is bent in a vertical direction toward the rotary axis (center of rotation), and is coupled to the joining part 66 of the coupling part 64. Additionally, the other end part is a free end, being free from restraint.

The agitator 68 receives torque from the joining part 66 of the coupling part 64, and rotates, and conveys the ink receiving particles in the particle storage cartridge main body 51 toward the discharge port 60 while agitating the particles. Thus, by discharging the particles from the discharge port 60, the recording apparatus may be additionally replenished with ink receiving particles.

The ink receiving particle storage cartridge according to the exemplary embodiment is not limited to the above configuration.

[Recording Apparatus]

The recording apparatus (recording method) of the exemplary embodiment is a recording apparatus (recording method) using the material set for recording including an ink and ink receiving particles according to the embodiment described above, and includes an intermediate transfer member, a supply unit that supplies the ink receiving particles onto the intermediate transfer member (supply process), an ink ejection unit that ejects ink onto the ink receiving particles that have been supplied onto the intermediate transfer member (ink ejection process), a transfer unit that transfers the ink receiving particles onto a recording medium (transfer process), and a fixing unit that fixes the ink receiving particles that have been transferred onto the recording medium (fixing process), wherein the ink receiving particles are supplied onto the intermediate transfer member, and receive the ink that has been ejected from the ink ejection unit.

Specifically, for example, first, the ink receiving particles are supplied from the supply unit onto an intermediate member (intermediate transfer member) in layer form. Ink is ejected from the ink ejection unit onto the ink receiving particles that have been supplied in layer form (hereinafter, ink receiving particle layer), and received. The ink receiving particle layer that has received the ink is transferred from the intermediate member onto the recording medium by the transfer unit. In the transfer, the entire ink receiving particle layer may be transferred, or a selected recording part (ink receiving part) may be transferred. The ink receiving particle layer transferred on the recording medium is pressed (or heated and pressed) and fixed by the fixing unit. Thus, the image is recorded by the ink receiving particles that have received the ink. In practice, transfer and fixing may be performed simultaneously or separately.

When receiving the ink, the ink receiving particles may form, for example, a layer, and the thickness of the ink receiving particle layer is, for example, in the range of 1 µm to 100 µm, or 3 µm to 60 µm, or 5 µm to 30 µm. The void ratio of ink receiving particle layer (that is, the ratio of voids between ink receiving particles+the ratio of voids inside the ink receiving particles (trap structure)) is, for example, 10% to 80%, or 30% to 70%, or 40% to 60%.

On the surface of the intermediate member, a releasing agent may be applied in advance prior to the supply of the ink receiving particles. Examples of the releasing agent include (modified) silicone oil, fluorine oil, hydrocarbon oil, mineral oil, vegetable oil, polyalkylene glycol, alkylene glycol ether, alkane diol, and fused wax.

The recording medium may be either a permeable medium (such as plain paper or coated paper) or an impermeable medium (such as art paper or resin film). The recording medium is not limited to these examples, and may include semiconductor substrate and other industrial products.

The recording apparatus (recording method) of the exemplary embodiment may includes a supply unit that supplies ink receiving particles onto a recording medium, an ink ejection unit that ejects ink onto the ink receiving particles that have been supplied onto the recording medium, and a fixing unit that fixes the ink receiving particles that have been supplied onto the recording medium and, in the recording apparatus (recording method), the ink receiving particles may be supplied onto a recording medium, and receive ink ejected from the ink ejection unit.

Specifically, first, the ink receiving particles are supplied from the supply unit onto the recording medium in layer form. Ink is ejected from the ink ejection unit onto the ink receiving particles that have been supplied in layer form (hereinafter, ink receiving particle layer), and received. The ink receiving particle layer that has received the ink is pressed (or heated and pressed) and fixed by the fixing unit. Thus, the image is recorded by the ink receiving particles that have received the ink. As thus described, supplying of the ink receiving particles directly onto the recording medium is a possible configuration.

In the following, some exemplary embodiments of the invention will be described with reference to the drawings. Elements having substantially the same effects or functions are represented by the same reference marks in all of the drawings, and overlapping descriptions thereof may be omitted in some cases.

Figure 5:
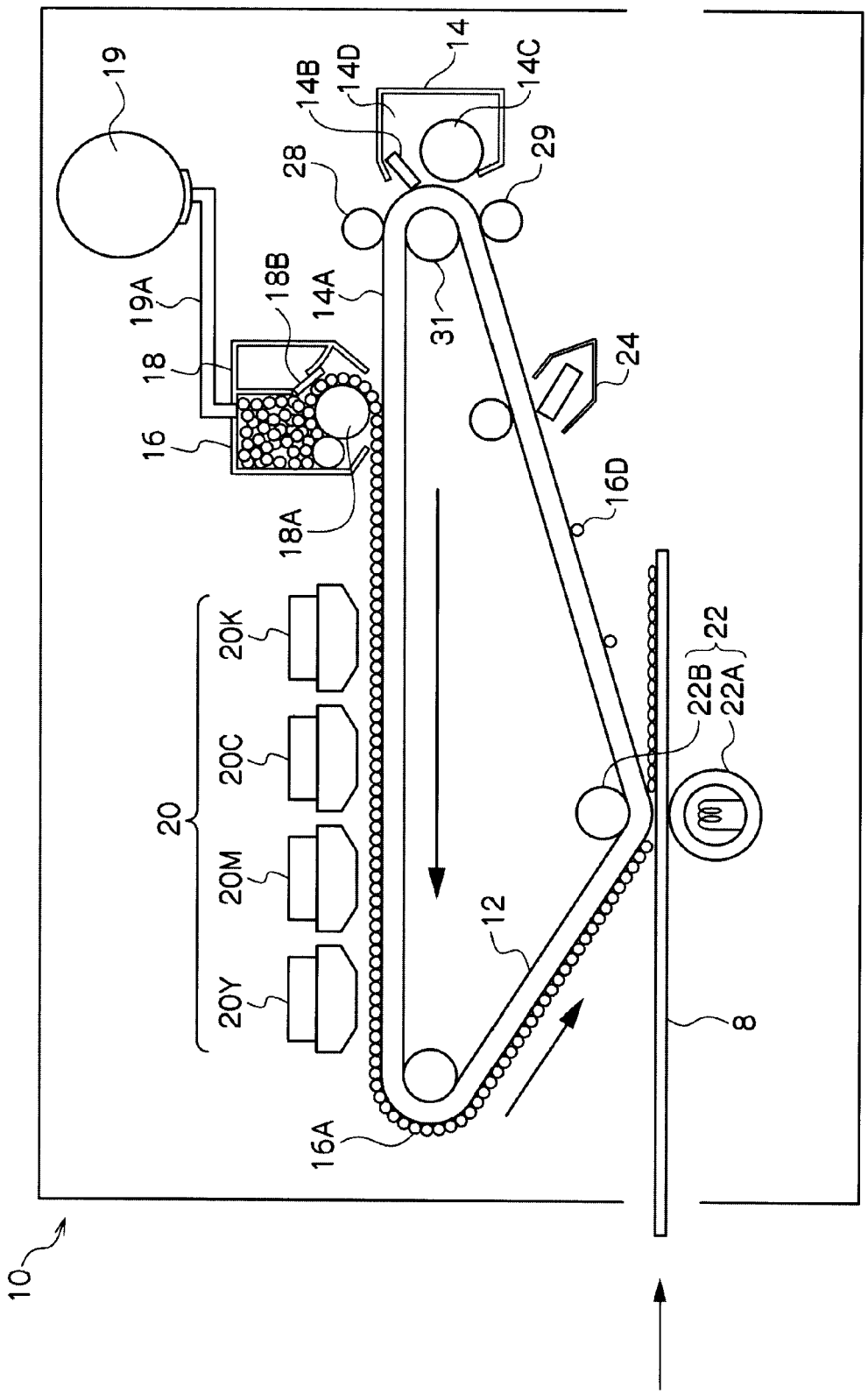
FIG. 5 is a configurational drawing that illustrates a recording apparatus according to an exemplary embodiment.
Figure 6:
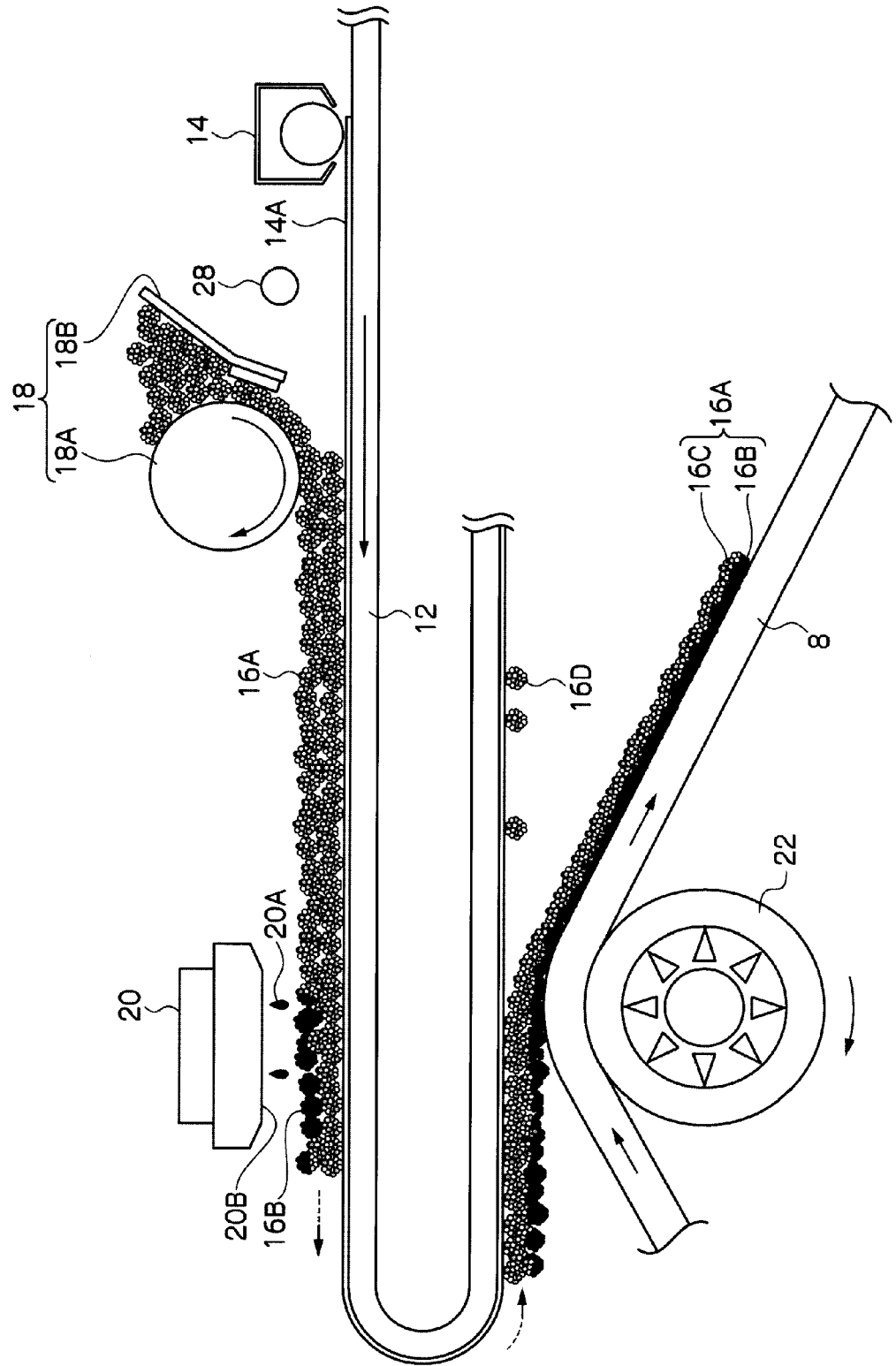
FIG. 6 is a configurational drawing that illustrates main components of a recording apparatus according to an exemplary embodiment.

FIG. 5 is a configuration drawing showing a recording apparatus according to an exemplary embodiment. FIG. 6 is a configuration drawing showing a main part of the recording apparatus according to this exemplary embodiment. FIGS. 7A and 7B are configuration drawings showing ink receiving particle layers according to this exemplary embodiment. In the following exemplary embodiment, explanation will be given according to a case where composite particles are used as the ink receiving particles described later.

As shown in FIG. 5 and FIG. 6, a recording apparatus 10 according to an exemplary embodiment includes an intermediate transfer member 12 in the form of an endless belt, a charging device 28 that charges the surface of the intermediate transfer member 12, a particle supply unit 18 that feeds ink receiving particles 16 to the charged area of the intermediate transfer member 12 to form a particle layer, an inkjet recording head 20 that ejects ink droplets onto the particle layer to form an image, and a transfer fixing unit 22 that transfers and fixes the layer of the ink receiving particles onto a recording medium 8 by contacting the intermediate transfer member 12 with the recording medium 8 and applying pressure and heat thereto. An ink receiving particle storage cartridge 19 is detachably connected to the particle supply unit 18 via a feed pipe 19A.

A releasing agent supply unit 14 that feeds a releasing agent 14D to form a releasing layer 14A is placed upstream of the charging device 28.

The particle supply unit 18 forms a layer of the ink receiving particles 16 on the surface of the intermediate transfer member 12 on which charges have been formed by the charging device 28. Ink droplets of the respective colors are ejected onto the particle layer from the inkjet recording heads 20, including the inkjet recording heads 20K, 20C, 20M, and 20Y for respective colors, thereby forming a color image.

The particle layer on the surface of which the color image has been formed is transferred, together with the color image, onto the recording medium 8 by the transfer fixing unit (transfer fixing roll) 22. At the downstream side of the transfer fixing unit 22, a cleaner 24 is disposed for removing ink receiving particles 16 remaining on the surface of intermediate transfer member 12, and for removing extraneous matter other than particles attached to the intermediate transfer member such as foreign matter (paper dust of the recording medium 8 or the like).

The recording medium 8 having the transferred color image is conveyed out, and charges are formed again on the surface of the intermediate transfer member 12 by the charging device 28. At this time, the ink receiving particles transferred onto the recording medium 8 absorb and retain the ink droplets 20A, thereby enabling speedy feeding out of the recording medium.

If necessary, a charge eraser 29 for erasing the charges left on the surface of the intermediate transfer member 12 may be placed between the cleaner 24 and the releasing agent supply unit 14 (hereinafter, the phrase "between A and B" indicates any position other than the positions for A and B, unless otherwise stated).

In this embodiment, the intermediate transfer member 12 includes a surface layer of 400 μm-thick ethylene-propylene rubber (EPDM) formed on a base layer made of a 1 mm-thick polyimide film. This surface layer may have a surface resistance of about $10^{13}$ Ω/square and a volume resistivity of about $10^{12}$ Ω·cm (semiconductivity).

When the intermediate transfer member 12 is rotated, the releasing agent layer 14A is formed first on the surface of the intermediate transfer member 12 by the releasing agent supply unit 14. The releasing agent 14D is supplied onto the surface of the intermediate transfer member 12 by a feed roll 14C of the releasing agent supply unit 14, and the thickness of the releasing agent layer 14A is regulated by a blade 14B.

This structure may be such that the releasing agent supply unit 14 is in contact with the intermediate transfer member 12 in a continuous manner for the purpose of continuously performing image formation and printing, or that the releasing agent supply unit 14 is placed apart from the intermediate transfer member 12.

The releasing agent 14D may be supplied from an independent liquid supply system (not shown) to the releasing agent supply unit 14 so that the releasing agent 14D may be supplied in a continuous manner.

Next, positive charges are applied onto the surface of the intermediate transfer member 12 by the charging device 28 so that the surface of the intermediate transfer member 12 is positively charged. In this process, an electric potential may be formed by which the ink receiving particles 16 may be supplied and adsorbed onto the surface of the intermediate transfer member 12, by means of an electrostatic force that may be generated between a feed roll 18A of the particle supply unit 18 and the surface of the intermediate transfer member 12.

In this embodiment, the recording apparatus has such a structure that a voltage is applied by mean of the charging device 28 between the charging device 28 and a driven roll 31 (connected to the ground) that is placed opposite to the charging device 28 via the intermediate transfer member 12, thereby charging the surface of the intermediate transfer member 12.

The charging device 28 is a roll-shaped component that includes a rod-shaped stainless steel material and an elastic layer in which an electrical conductivity-imparting material is dispersed (a urethane foam resin) formed on the surface of the rod-shaped material, and has a volume resistivity regulated to be from about $10^6$ Ω·cm to about $10^8$ Ω·cm. In addition, the surface of the elastic layer is covered with a water- and oil-repellant coating layer (for example, made of a tetrafluoroethylene-perfluoroalkyl vinyl ether copolymer (PFA)) with a thickness of 5 μm or more but 100 μm or less.

The charging device 28 is connected to a DC power source, and the driven roll 31 is electrically connected to the frame ground. The charging device 28 is driven while holding the intermediate transfer member 12 between the driven roll 31 and the charging device 28. At the pressing site, a predetermined degree of potential difference is generated between the charging device 28 and the grounded driven roll 31, by which charges may be applied to the surface of the intermediate transfer member 12. In this embodiment, for example, the surface of the intermediate transfer member 12 is charged by the charging device 28.

The charging device 28 may be a corotron or the like.

The ink receiving particles 16 are then fed from the particle supply unit 18 to the surface of the intermediate transfer member 12 to form an ink receiving particle layer 16A. The particle supply unit 18 includes, in a vessel storing the ink receiving particles 16, a feed roll 18A placed opposite to the intermediate transfer member 12 and a charging blade 18B placed so as to apply pressure to the feed roll 18A. The charging blade 18B also have the function of controlling the thickness of the layer formed by ink receiving particles 16 supplied onto the surface of the feed roll 18A.

When the ink receiving particles 16 are supplied to the feed roll 18A (conductive roll), the ink receiving particle layer 16A is regulated by the charging blade 18B (conductive blade) and is negatively charged, i.e., provided with the polarity opposite to that of the charges on the surface of the intermediate transfer member 12. For example, an aluminum solid roll may be used as the feed roll 18A, and a metal plate (such as a SUS plate) with a urethane rubber for pressing may be used as the charging blade 18B. The charging blade 18B is in contact with the feed roll 18A in a doctor blade manner.

The charged ink receiving particles 16 form a particle layer consisting of, for example, a single layer, on the surface of the feed roll 18A and are delivered to a site facing the surface of the intermediate transfer member 12, and are then transferred onto the surface of the intermediate transfer member 12 by an electrostatic force formed by the electric field generated by the potential difference between the feed roll 18A adjacent to the above site and the surface of the intermediate transfer member 12.

In this process, the moving speed of the intermediate transfer member 12 and the rotating speed of the feed roll 18A (the peripheral speed ratio) are relatively set such that a single layer of particles is formed on the surface of the intermediate transfer member 12. The peripheral speed ratio depends on the amount of the charges on the intermediate transfer member 12, the amount of the charges on the ink receiving particles 16, the positional relationship between the feed roll 18A and the intermediate transfer member 12, or other parameters.

By relatively increasing the peripheral speed of the feed roll 18A with reference to the peripheral speed ratio at which a single ink receiving particle layer 16A is formed, the amount of the particles supplied onto the intermediate transfer member 12 may be increased. If the density of the transferred image is low (the ejecting amount of the ink is small; for example, 0.1 g/m² or more but 1.5 g/m² or less), the layer thickness may be minimized; for example, 1 μm or more but 5 μm or less). If the image density is high (the ejection amount of the ink is large; for example, 4 g/m² or more but 15 g/m² or less), the layer thickness may be regulated to be a sufficient level for retaining a ink liquid component, e.g., a solvent or a dispersion medium (for example, 10 μm or more but 25 μm or less).

For example, in a case where a character or image is printed with a small ejecting amount of the ink, when an image is formed onto a single ink receiving particle layer on the intermediate transfer member, the image-forming material (pigment) in the ink is trapped on the surface of the ink receiving particle layer on the intermediate transfer member, and is fixed on the surface of the ink receiving particles or in the voids of particles in the ink receiving particles, so that the distribution of the ink in the depth direction is reduced.

For example, when a particle layer 16C is desired to be formed as a overcoat layer on an image layer 16B that will become a final image, the ink receiving particle layer 16A may be formed to have a thickness of about three layers and an image is formed with ink on the uppermost layer (see FIG. 7A). In this way, the particle layer 16C corresponding to two layers having no image will form a protective layer on the image layer 16B after being transferred and fixed on a recording medium (see FIG. 7B).

When an image is formed with a large ejecting amount of ink, such as an image including secondary or tertiary colors, the ink receiving particles 16 are layered so that there are enough particles to retain a ink liquid component (e.g., a solvent or a dispersion medium), thereby trapping the recording material (e.g., a pigment) to prevent it from reaching the bottom layer. In this case, the ink receiving particles 16 having no image may form a overcoat layer on the surface of the image after being transferred and fixed, so that the image-forming material (pigment) is not exposed on the surface of the image.

The inkjet recording head 20 then applies ink droplets 20A onto the ink receiving particle layer 16A. The inkjet recording head 20 applies the ink droplets 20A onto a predetermined location according to the given image information.

Finally, the recording medium 8 and the intermediate transfer member 12 are nipped by the transfer fixing unit 22, and pressure and heat are applied to the ink receiving particle layer 16A to transfer it onto the recording medium 8.

The transfer fixing unit 22 includes a heating roll 22A containing a heat source and a pressing roll 22B facing the heating roll 22A via the intermediate transfer member 12, and a contact portion is formed between the heating roll 22A and the pressing roll 22B. An aluminum core coated with a silicone rubber and further coated with a PFA tube, for example, may be used as the heating roll 22A and the pressing roll 22B.

At the contact portion formed between the heating roll 22A and the pressing roll 22B, the ink receiving particle layer 16A is heated by a heater and pressure is applied, and therefore the ink receiving particle layer 16A is transferred and fixed onto the recording medium 8.

In this process, organic resin particles of the ink receiving particles 16 in the non-image area are heated to a temperature of not less than the glass transition temperature (Tg) to be softened (or melted), and the ink receiving particle layer 16A is released from the releasing layer 14A that has been formed on the surface of the intermediate transfer member 12 by pressure, and transferred and fixed onto the recording medium 8. In this process, the transfer fixing ability may be improved by heating. In this embodiment, the temperature of the surface of the heating roll 22A is controlled to be 160° C. In this process, the ink liquid component (a solvent or a dispersion medium) is retained in the ink receiving particle layer 16A even after the transfer, and is fixed. Further, the intermediate transfer member 12 may be pre-heated before entering to the transfer fixing unit 22.

Additionally, either of a permeable medium (for example, plain paper or inkjet coat paper) or a non-permeable medium (for example, art paper or resin film) may be employed as the recording medium 8. Further, the recording medium is not limited thereto and, in addition, includes industrial products such as a semiconductor substrate.

The process of forming an image in the recording apparatus according to this embodiment will be described in more detail below. As shown in FIG. 6, the releasing layer 14A may be formed on the surface of the intermediate transfer member 12 by the releasing agent supply unit 14 in the recording apparatus according to this embodiment. When the base material of the intermediate transfer member 12 is aluminum- or PET-based, the releasing layer 14A may be formed. Alternatively, the surface of the intermediate transfer member 12 in itself may have a releasing ability by using a material of fluoropolymer- or silicone rubber-based.

The surface of the intermediate transfer member 12 is then charged by the charging device 28 to be polarized oppositely to that of the ink receiving particles 16. Thus, the ink receiving particles 16 supplied from the feed roll 18A of the particle supply unit 18 may be electrostatically adsorbed to form a layer of the ink receiving particles 16 on the surface of the intermediate transfer member 12.

The layer of ink receiving particles 16 are then formed on the surface of the intermediate transfer member 12 by means of the feed roll 18A of the particle supply unit 18. For example, the ink receiving particle layer 16A is formed to have a thickness of about three layers of the ink receiving particles 16. Specifically, the thickness of the ink receiving particle layer 16A is regulated to a desired degree by the gap between the feed roll 18A and the charging blade 18B, thereby controlling the thickness of the ink receiving particle layer 16A to be transferred to the recording medium 8. Alternatively, the thickness may be controlled by the ratio of the peripheral speeds of the feed roll 18A and the intermediate transfer member 12.

The ink droplets 20A are then ejected onto the formed ink receiving particle layer 16A by the inkjet recording heads 20 of respective colors, driven in a piezoelectric mode, a thermal mode or the like, to form the image layer 16B on the ink receiving particle layer 16A. The ink droplets 20A are ejected from the inkjet recording head 20 into the ink receiving particle layer 16A, and the liquid component of the ink is rapidly absorbed into the voids among the ink receiving particles 16 and into the voids within the ink receiving particles 16, and at the same time, the recording material (such as a pigment) is also trapped on the surface of the ink receiving particles 16 (constituent particles) or in the interparticle voids in the constituent particles of the ink receiving particles 16.

In this process, while the ink liquid component (a solvent or a dispersion medium) in the ink droplets 20A penetrates into the ink receiving particle layer 16A, the recording material such as a pigment is trapped on the surface of the ink receiving particle layer 16A or in the interparticle voids thereof. In other words, the ink liquid component (a solvent or a dispersion medium) may be allowed to pass through to the back side of the ink receiving particle layer 16A, whereas the recording material such as a pigment is not. Thus, in the process of transferring an image to the recording medium 8, a particle layer 16C to which the recording materials such as a pigment is not penetrated is formed on an image layer 16B. As a result, the particle layer 16C forms a protective layer that seals the surface of the image layer 16B, and an image having a surface on which no recording material is exposed may be formed.

The ink receiving particle layer 16A having the image layer 16B formed thereon is then transferred and fixed from the intermediate transfer member 12 onto the recording medium 8, thereby forming a color image on the recording medium 8. The ink receiving particle layer 16A on the intermediate transfer member 12 is heated and pressed by the transfer fixing unit (a transfer fixing roll) 22 that is heated by a heating part such as a heater, and is transferred onto the recording medium 8.

In this process, the surface irregularities of the image and the glossiness may be regulated by controlling the heating and pressing conditions. Alternatively, the glossiness may be controlled by performing cool separation.

After the ink receiving particle layer 16A has been separated, the residual particles 16D on the surface of the intermediate transfer member 12 are collected by the cleaner 24 (see FIG. 5), and the surface of the intermediate transfer member 12 is charged again by the charging device 28, and the ink receiving particles 16 are supplied thereon to form an ink receiving particle layer 16A.

FIG. 7 shows particle layers used in the image formation according to the invention. As shown in FIG. 7A, the releasing layer 14A is formed on the surface of the intermediate transfer member 12.

The ink receiving particles 16 is then formed into layer on the surface of the intermediate transfer member 12, by using the particle supply unit 18. As described above, the ink receiving particles 16 may be stacked in about three layers in a thickness direction of the ink receiving particle layer 16A. The thickness of the ink receiving particle layer on the recording medium 8 may be controlled by controlling the ink receiving particle amount of the layer 16A. In this process, the surface of the ink receiving particle layer 16A is smoothed so that image formation (formation of the image layer 16B) by ejecting ink droplets may be performed without problems.

As shown in FIG. 7A, a recording material such as a pigment contained in the ejected ink droplets 20A penetrates into the ink receiving particle layer 16A to an amount of about ⅓ to about half of the total thickness thereof, and under the ink receiving particle layer 16A remains the particle layer 16C into which no recording material such as a pigment has not penetrated.

As shown in FIG. 7B, the ink receiving particle layer 16A formed on the recording medium 8 by heat/press transfer at the transfer fixing unit (transfer fixing roll) 22 includes the image layer 16B and the ink-free particle layer 16C on the image layer 16B, and the layer 16C serves as a kind of overcoat layer to prevent the image layer 16B from being directly exposed on the surface. Therefore, the ink receiving particles 16 need to be transparent at least after fixation.

The particle layer 16C is heated and pressed by the transfer fixing unit (transfer fixing roll) 22 so that its surface may be smoothed, and also the glossiness of the image surface may be controlled by heating or pressing.

Further, evaporation of the ink liquid component (a solvent or a dispersion medium) trapped in the ink receiving particles 16 may be enhanced by heating.

The ink liquid component (a solvent or a dispersion medium) that has been received and retained in the ink receiving particle layer 16A remains in the ink receiving particle layer 16A even after the transfer and fixing, and is then removed by air drying.

The image formation is completed via the above-mentioned processes. As regards the intermediate transfer member 12, when, after the ink receiving particles 16 have been transferred to the recording medium 8, the residual particles 16D remain on the intermediate transfer member 12 or an adhesion matter such as paper powder separated from the recording medium 8 is present, these may be removed by the cleaner 24.

A charge eraser 29 may be disposed downstream of the cleaner 24. For example, an electrically conductive roll is used as the charge eraser 29, and the intermediate transfer member 12 is interposed between the electrically conductive roll and a driven roll 31 (grounded), and then a voltage of approximately ±3 kV and 500 Hz is applied to the surface thereof to erase electric charge from the surface of the intermediate transfer member 12.

The charging voltage, the thickness of the particle layer, the fixing temperature and other various conditions for the device may be optimized, respectively, depending on the composition of the ink receiving particles 16 or the ink, the amount of the ink to be ejected, and the like.

<Constituent Elements>

Constituent elements for each step of the embodiment will be described in detail below.

<Intermediate Transfer Member>

The intermediate transfer member 12 on which the ink receiving particle layer is formed may be in the form of a belt as shown in the embodiment, or in the form of a cylinder (a drum). In order to supply and retain the ink receiving particles on the surface of the intermediate transfer member by electrostatic force, the outer surface of the intermediate transfer member needs to have semiconductive or insulating particle-retention properties. When the electrical properties of the surface of the intermediate transfer member is semiconductive, a material with a surface resistivity of $10^{10}$ Ω/square or more and $10^{14}$ Ω/square or less and a volume resistivity of $10^{9}$ Ω·cm or more and $10^{13}$ Ω·cm or less is used, and when the electrical properties of the surface of the intermediate transfer member is insulating, a material with a surface resistivity of $10^{14}$ Ω/square or more and a volume resistivity of $10^{13}$ Ω·cm or more may be used.

When the intermediate transfer member is in the form of a belt, any material may be used for the base material, as long as the material is capable of belt rotation driving in an apparatus and has necessary mechanical strength, and when heat is applied for transfer and fixing, necessary heat resistance. Specifically, polyimide, polyamideimide, aramid resins, polyethylene terephthalate, polyester, polyethersulfone, stainless steel, or the like may be used.

When the intermediate transfer member is in the form of a drum, the base material may be aluminum, stainless steel or the like.

When the heating method is performed by electromagnetic induction in the fixing process with the transfer fixing unit (transfer fixing roll) 22, a heat generating layer may be formed on the intermediate transfer member 12 instead of on the transfer fixing unit (transfer fixing roll) 22. A metal capable of causing electromagnetic induction may be used for the heat generating layer, which may be selected from nickel, iron, copper, aluminum, chromium, and the like.

<Particle Supply Process>

Prior to supplying the ink receiving particles 16, the releasing layer 14A is formed with the releasing agent 14D supplied from the releasing agent supply unit 14 on the surface of the intermediate transfer member 12.

The releasing layer 14A may be formed by a method including feeding the releasing agent 14D, from a releasing agent supply unit that stores the releasing agent 14D, to the surface of the intermediate transfer member 12 to form the releasing layer 14A, or by a method including forming the releasing layer 14A on the surface of the intermediate transfer member 12 using a supplying member that has been impregnated with the releasing agent 14D.

Examples of the releasing agent 14D include releasing materials such as silicone-based oil, fluorine-based oil, polyalkylene glycol, and surfactants.

Examples of the silicone-based oil include straight silicone oil and modified silicone oil.

Examples of the straight silicone oil include dimethyl silicone oil and methylhydrogen silicone oil.

Examples of the modified silicone oil include methylstyryl modified oil, alkyl modified oil, higher fatty acid ester modified oil, fluorine modified oil, and amino modified oil.

Examples of polyalkylene glycol include polyethylene glycol, polypropylene glycol, ethylene oxide-propylene oxide copolymer, and polybutylene glycol; however, polypropylene glycol may be used among these.

Examples of the surfactants include anionic surfactants, cationic surfactants, amphoteric surfactants, and nonionic surfactants; however, among these, nonionic surfactants may be used.

The viscosity of the releasing agent 14D is, for example, from 5 mPa·s to 200 mPa·s, or from 5 mPa·s to 100 mPa·s, or from 5 mPa·s to 50 mPa·s.

The measurement of the viscosity is conducted as follows. The viscosity of the obtained ink was measured using a RHEOMAT 115 (manufactured by Contraves) as the measurement device. The measurement was performed by putting a sample into a measurement container and loading it into the device according to a given method, and then measuring at a measuring temperature of 40° C., and a shearing speed of 1400 $s^{-1}$.

The surface tension of the releasing agent 14D is, for example, in the range of not more than 40 mN/m (or not more than 30 mN/m, or not more than 25 mN/m).

Here, measurement of the surface tension is performed as follows. With ambient conditions of 23±0.5° C., and 55±5% R.H. the surface tension of an obtained sample is measured using a Willhermy type surface tensiometer (manufactured by Kyowa Kaimen Kagaku Corp.).

The boiling point of the releasing agent 14D is, for example, not less than 250° C. (or not less than 300° C., or not less than 350° C.) under the pressure of 760 mmHg.

Additionally, the measurement of the boiling point is conducted as follows. The measurement is conducted in accordance with JIS K2254, the disclosure of which is incorporated by reference herein, and the initial distillation point is used as the boiling point.

Subsequently, the surface of the intermediate transfer member 12 is electrically charged to a reverse polarity to the polarity of the ink receiving particles 16, by means of a charging device 28. Then, an ink receiving particle layer 16A is formed at the surface of the charged intermediate transfer member 12. A general method for supplying electrophotographic toners onto a photoreceptor may be applied as the method for forming the ink receiving particle layer 16A. In other words, electrical charge is supplied in advance to the surface of the intermediate transfer member 12 in accordance with a general electrophotographic charging process (electric charging by the charging device 28 or the like). The ink receiving particles 16 are frictionally charged (single-component frictional charging system or two-component system) with the reverse polarity to the polarity of the surface of the intermediate transfer member 12.

The ink receiving particles 16 held on the feed roll 18A form an electric field with the surface of the intermediate transfer member 12, and are transferred and supplied onto the intermediate transfer member 12 and held there by electrostatic force. In this process, the thickness of the ink receiving particle layer 16A may be controlled depending on the thickness of the image layer 16B formed as a part of the ink receiving particle layer 16A (depending on the amount of the ink to be ejected). In this process, the absolute value of the amount of the charge of the ink receiving particles 16 may be in the range of 5 µC/g or more but 50 µC/g or less.

In this process, the thickness of the ink receiving particle layer 16A may be 1 µm or more but 100 µm or less, or 1 µm or more but 50 µm or less, or 5 µm or more but 25 µm or less. The porosity of the ink receiving particle layer (i.e., the sum of the void ratio between the ink receiving particles and the void ratio in the ink receiving particles (trap structure)) may be 10% or more but 80% or less, or 30% or more but 70% or less, or 40% or more but 60% or less.

Here, a particle supply process corresponding to a single-component supply (development) method will be described.

The ink receiving particles 16 are supplied to the feed roll 18A, then charged and the thickness thereof is regulated by the charging blade 18B.

The charging blade 18B has a function to regulate the thickness of the layer of the ink receiving particles 16 formed on the surface of the feed roll 18A. For example, the charging blade 18B may change the layer thickness of the ink receiving particles 16 on the surface of the feed roll 18A by changing the pressure applied to the feed roll 18A. For example, by forming a single layer of the ink receiving particles 16 on the surface of the feed roll 18A, the layer of the ink receiving particles 16 on the surface of the intermediate transfer member 12 may be made in the form of a single layer. Alternatively, by setting the pressing force of the charging blade 18B to a low level, the thickness of the layer of the ink receiving particles 16 formed on the surface of the feed roll 18A may be increased, and thus the thickness of the ink receiving particle layer formed on the surface of the intermediate transfer member 12 may be increased.

A method may also be mentioned in which, for example, when the peripheral speeds of the feed roll 18A and the intermediate transfer member 12 are defined as 1 respectively, at which a single particle layer is formed on the surface of the intermediate transfer member 12, the thickness of the layer of the ink receiving particles 16 may be increased by increasing the peripheral speed of the feed roll 18A to increase the amount of the ink receiving particles 16 supplied onto the surface of the intermediate transfer member 12. Further, these methods may be combined to control the layer thickness. In the configuration as described above, for example, the ink receiving particles 16 are negatively charged, and the intermediate transfer member 12 is positively charged.

By controlling the thickness of the ink receiving particle layer in such a manner, a pattern having a overcoat layer coating the surface of the pattern may be formed with reduced consumption of ink receiving particles.

The charging roll in the charging device 28 may be a bar- or pipe-shaped member made of aluminum, stainless steel or the like having an elastic layer formed on the outer surface thereof, the elastic layer containing a conductivity-imparting material dispersed therein, and the roll having a diameter of 10 mm or more and 25 mm or less and a volume resistivity that is controlled to be about $10^6$ Ω·cm or more and about $10^8$ Ω·cm or less.

The elastic layer may be formed using urethane resins, thermoplastic elastomers, epichlorohydrin rubbers, ethylene-propylene-diene copolymer rubbers, silicone rubbers, acrylonitrile-butadiene copolymer rubbers, polynorbornene rubbers, and any other resin materials. These materials may be used alone or in combination of two or more, and a urethane foam resin may be used.

The urethane foam resin may be a urethane resin containing a hollow material such as hollow glass beads and thermally expandable microcapsules mixed and dispersed therein to have a closed-cell structure.

The surface of the elastic layer may be covered with a water-repellant coating layer with a thickness of 5 µm or more and 100 µm or less.

The charging device 28 is connected to a DC power source, and the driven roll 31 is electrically connected to the frame ground. The charging device 28 is driven while holding the intermediate transfer member 12 between the charging device 28 and the driven roll 31, and a predetermined potential difference is generated between the charging device 28 and the grounded driven roll 31 at the pressing site.

<Marking Process>

An image is formed by ejecting the ink droplets 20A from the inkjet recording head 20 onto the layer of the ink receiving particles 16 (ink receiving particle layer 16A) which has been formed on the surface of the intermediate transfer member 12, according to an image signal. The ink droplets 20A are ejected into the ink receiving particle layer 16A from the inkjet recording head 20, and are rapidly absorbed into the interparticle voids formed in the ink receiving particles 16, while the recording material (such as a pigment) is trapped on the surface of the ink receiving particles 16 or in the interparticle voids of the ink receiving particles 16.

In this case, a large amount of the recording material (such as a pigment) may be trapped on the surface of the ink receiving particle layer 16A. The interparticle voids in the ink receiving particles 16 exhibit a filter effect so that the recording material (such as a pigment) is trapped on the surface of the ink receiving particle layer 16A, and is trapped and fixed in the interparticle voids in the ink receiving particles 16.

In order to ensure the trapping of the recording material (such as a pigment) on the surface of the ink receiving particle layer 16A and in the interparticle voids in the ink receiving particles 16, a method may be applied in which the ink is allowed to react with the ink receiving particles 16 to rapidly insolubilize (aggregate) the recording material (such as a pigment). Specifically, a reaction between the ink and a polyvalent metal salt or a pH reaction type may be applied to the above reaction.

The inkjet recording head may be a line-type inkjet recording head having a width equal to or larger than the width of the recording medium. However, an image may also be formed on a particle layer formed on an intermediate transfer member in a sequential manner using a conventional scanning-type inkjet recording head. The parts for ejecting ink of the inkjet recording head 20 may be any one as long as it is capable of ejecting ink, such as a piezoelectric element-driving type or a heating element-driving type. Conventional inks containing a dye as a colorant may be used for the ink, but an ink containing a pigment may be used.

When reacting the ink receiving particles 16 with an ink, the ink receiving particles 16 is treated with an aqueous solution containing a coagulant (for example, a polyvalent metal salt or an organic acid) having an effect of coagulating a pigment by the reaction of the coagulant with the ink, and dried.

<Transfer Process>

The ink receiving particle layer 16A having received the ink droplets 20A and having been formed with an image is transferred and fixed onto the recording medium 8 so that the image is formed on the recording medium 8. The transfer and the fixing may be performed separately, but may be performed substantially simultaneously. The fixing may be performed by a method of heating the ink receiving particle layer 16A or a method of pressing it, or a method including both heating and pressing, but may be performed by a method of performing heating and pressing substantially simultaneously.

By controlling the heating and pressing, physical properties and glossiness at the surface of the ink receiving particle layer 16A may be controlled. After the heating and pressing, the recording medium 8 having the image (ink receiving particle layer 16A) transferred thereon may be separated from the intermediate transfer member 12 after cooling the ink receiving particle layer 16A. The cooling may be performed by natural cooling or forced cooling such as air cooling. For these processes, the intermediate transfer member 12 may be used in the form of a belt.

The ink image may be formed on a surface part of the layer of the ink receiving particles 16 formed on the intermediate transfer member 12 (the recording material (pigment) is trapped on the surface of the ink receiving particle layer 16A) so that the ink image is protected by the particle layer 16C of the ink receiving particles 16, when transferred onto the recording medium 8.

The ink liquid component (a solvent or a dispersion medium) that has been received and retained by the layer of the ink receiving particles 16 is maintained in the layer of the ink receiving particles 16 even after the transfer and the fixing, and is then removed by air drying.

<Cleaning Process>

To allow repeated use by refreshing the surface of intermediate transfer member 12, a process of cleaning the surface by the cleaner 24 may be carried out. The cleaner 24 includes a cleaning part and a recovery part for conveying particles (not shown), and by the cleaning process, the ink receiving particles 16 (residual particles 16D) remaining on the surface of intermediate transfer member 12, and extraneous matter other than particles attached to the surface of intermediate transfer member 12 such as adhesion matter (paper dust of the recording medium 8 and the like) may be removed. The recovered residual particles 16D may be reused.

<Charge erasing Process>

The surface of the intermediate transfer member 12 may be subjected to charge erasing using the charge eraser 29 prior to forming the releasing layer 14A.

In the recording apparatus according to this embodiment described above, the surface of the intermediate transfer member 12 is charged by the charging device 28 after supplying the releasing agent 14D from the releasing agent supply unit 14 to the surface of the intermediate transfer member 12 to form the releasing layer 14A. The ink receiving particles 16 are then supplied from the particle supply unit 18 to the region where the releasing layer 14A has been formed and charged of the intermediate transfer member 12, thereby forming a particle layer. Thereafter, ink droplets are ejected from the inkjet recording head 20 onto the particle layer to form an image, and the ink is received by the ink receiving particles 16. The recording medium 8 is then superposed onto the intermediate transfer member 12, pressed and heated by the transfer fixing unit 22, and thus the ink receiving particle layer is transferred and fixed onto the recording medium 8.

The recording apparatus is not limited to the intermediate transfer system configuration and may have another configuration in which the ink receiving particles are supplied directly onto the recording medium, as described below.

Figure 8:
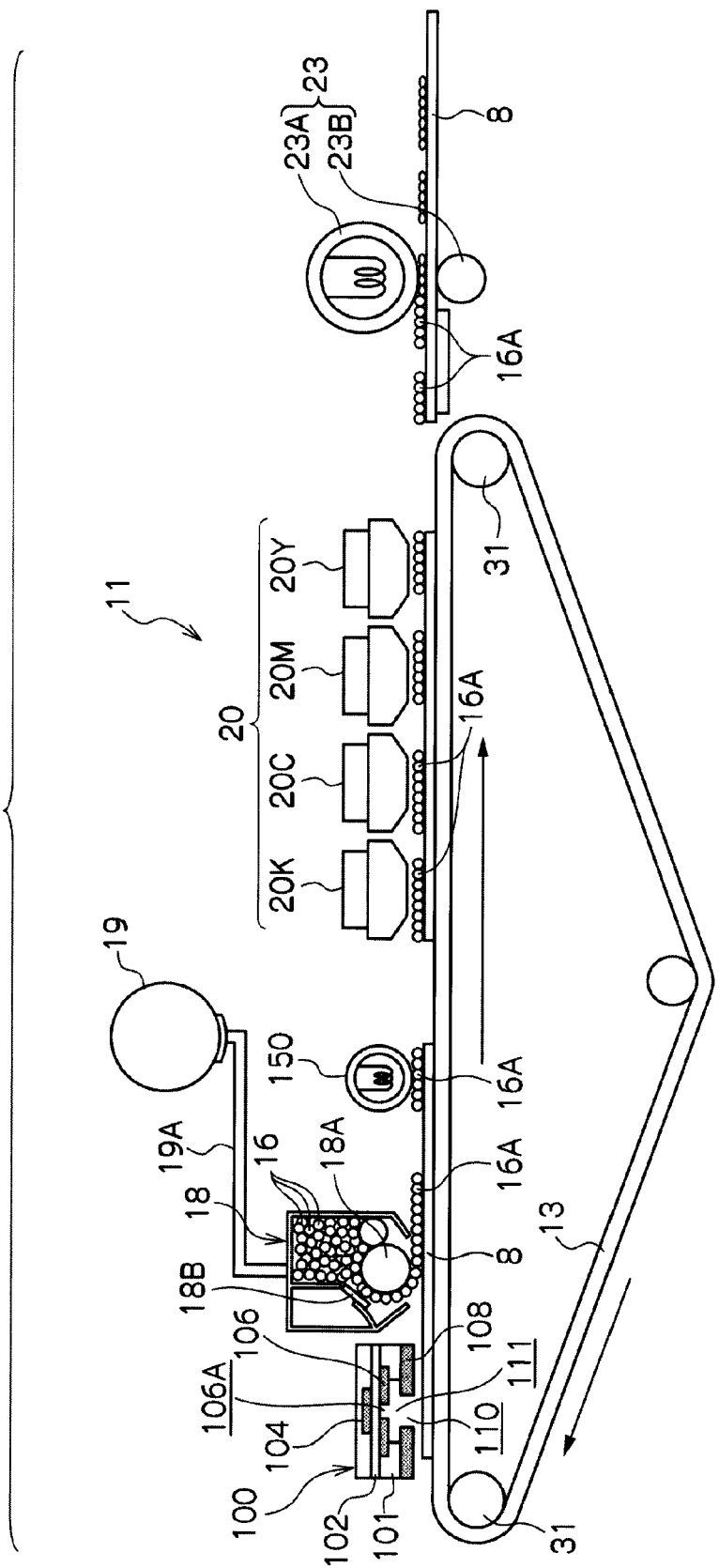
FIG. 8 is a configurational drawing that illustrates a recording apparatus according to another exemplary embodiment.
Figure 9:
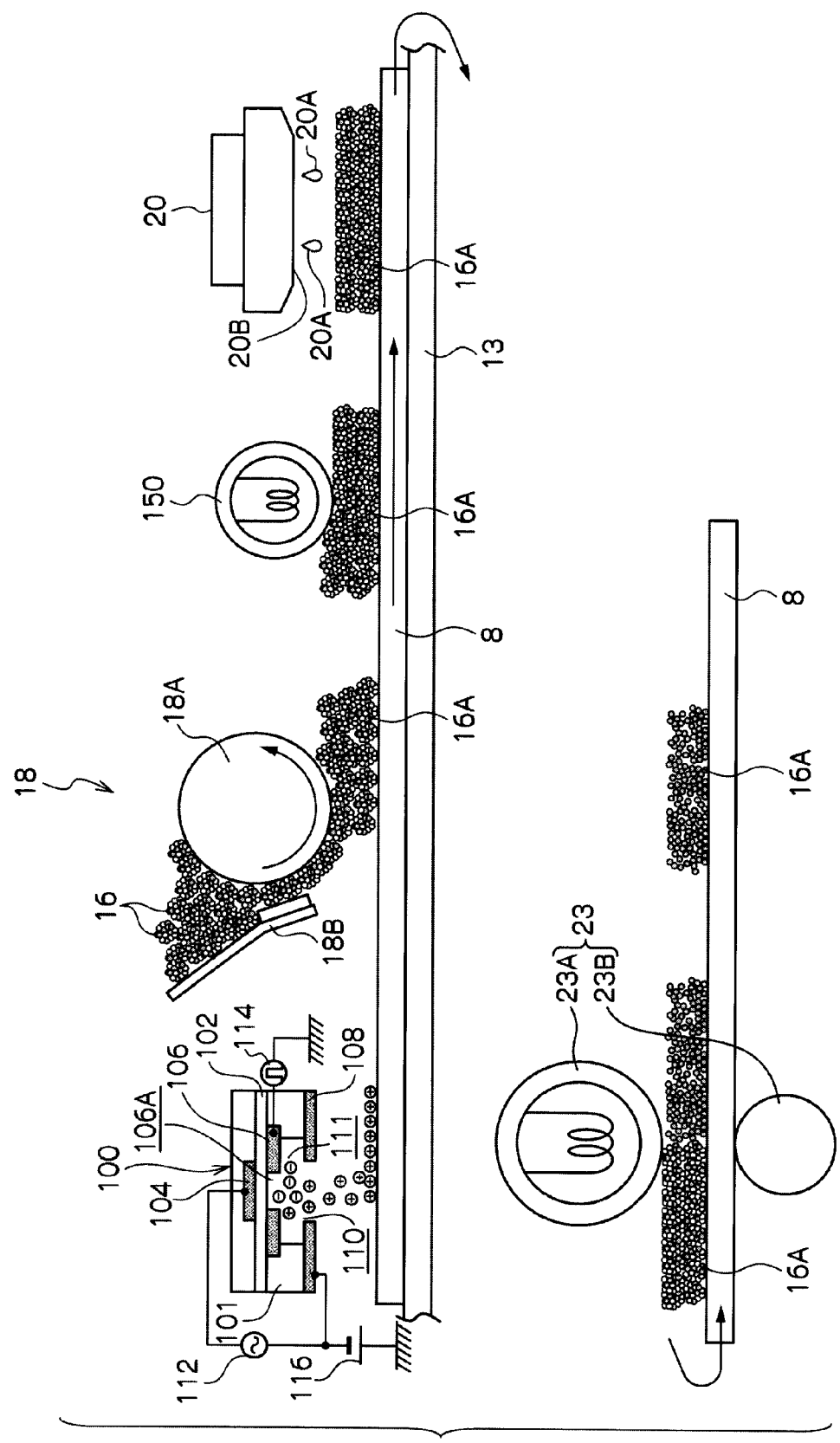
FIG. 9 is a configurational drawing that illustrates the main components of a recording apparatus according to another exemplary embodiment.

FIG. 8 is a configurational drawing showing a recording apparatus according to another exemplary embodiment. FIG. 9 is a configurational drawing showing the main components of a recording apparatus according to the other exemplary embodiment. A case in which composite particles are applied as ink receiving particles is described in the following other exemplary embodiment.

As shown in FIG. 8 and FIG. 9, a recording apparatus 11 of the other exemplary embodiments has an endless belt-shaped conveyer belt 13. The conveyer belt 13 moves rotationally and conveys the recording medium 8 supplied from a storage container (not shown).

First, an electrostatic latent image is formed on the recording medium 8 being conveyed on the conveyer belt 13, when an ion flow control electrostatic recording head 100 (hereinafter, "electrostatic recording head 100") controls an ion flow caused by discharge and the recording medium 8 is irradiated thereby (see FIG. 10A).

An ink receiving particle supply unit 18 effects visualization of the electrostatic latent image formed on the recording medium 8 to form the ink receiving particle layer 16A composed of the ink receiving particles 16 (see FIG. 10B).

A preliminary fixing device 150 preheats and fixes the ink receiving particle layer 16A formed on the recording medium 8.

Based on the image data, ink droplets 20A (see FIG. 9) of respective colors are ejected from inkjet recording heads 20K, 20C, 20M and 20Y for the respective colors black (K), cyan (C), magenta (M), and yellow (Y), onto the ink receiving particle layer 16A that has been preheated and fixed and, as a result, an ink image is formed (see FIG. 10C). Further, in the following, when it is necessary to distinguish between the respective colors, the letters Y, M, C, and K will be attached after reference numerals; however, when there is no particular need for distinguishing between the respective colors, the letters Y, M, C, and K are omitted.

The ink receiving particle layer 16A on which the ink image was formed by the ejection of ink droplets 20A is fixed onto the recording medium 8 by the application of pressure and heat from the fixing device 23.

Additionally, the electrostatic recording head 100 and the inkjet recording head 20 are line-type recording heads having a width equal to or larger than the width of the recording medium 8, which are known as FWA (Full Width Array) system recording heads.

Respective constituent elements and an image forming process are explained below in detail.

An endless belt-shaped conveyer belt 13 conveys the recording medium 8. In the present exemplary embodiment, the recording medium 8 is conveyed in a state in which it is adsorbed on the conveyer belt 13.

One example of the method for adsorbing the recording medium 8 to the conveyer belt 13 is to provide holes (not shown) in the conveyer belt 13 and to have a suction mechanism effect adsorption by suctioning through the holes. Other examples of the method for adsorbing the recording medium 8 to the conveyer belt 13 include a method of adsorption by adhesive force and a method of electrostatically adsorbing the recording medium 8 to the conveyer belt 13.

At an upstream side in the conveyance direction, the electrostatic recording heads 100 for forming an electrostatic latent image on the recording medium 8 conveyed by the conveyer belt 13, are deployed at an interval above the recording medium 8.

The electrostatic recording head 100 is provided with plural driving electrodes 104 disposed in parallel with each other on the surface of a planar rectangular insulation substrate 102, and with plural controller electrodes 106 disposed so as to intersect with the driving electrodes 104 at a back surface thereof. Further, a matrix (grating) is formed by the driving electrodes 104 and the controller electrodes 106. Further, at the controller electrodes 106, circular opening parts 106A are formed at positions of intersection with the driving electrodes 104. In addition, a screen electrode 108 is disposed at the lower surface of the controller electrode 106 via an insulation substrate 101. At the insulation substrate 101 and screen electrode 108, a space 111 and an ion extraction opening part 110 are formed at positions corresponding to the opening parts 106A of the controller electrodes 106.

High frequency high voltage is applied between the driving electrode 104 and the screen electrode 108 by an alternating current power source 112. Further, a pulse voltage corresponding to the image information is applied to the controller electrode 106 by an ion controlled power source 114. Further, DC voltage is applied to the screen electrode 108 by a direct-current power source 116.

Application of an alternating electric field between the driving electrodes 104 and the controller electrodes 106 thus insulated from each other induces creeping corona discharge in the space 111. Accelerating or absorbing the ions generated by the creeping corona discharge by means of the electric field formed between the controller electrodes 106 and the screen electrode 108, and controlling discharge of ion flow from the ion extraction opening part 110, an electrostatic latent image (see FIG. 10A) is formed on the surface of the recording medium 8 by the ions (plus ions in the exemplary embodiment) corresponding to the image signal (ink image).

In the next process, the electric potential of the electrostatic latent image may be any potential capable of feeding/adsorbing the ink receiving particles 16 onto the recording medium 8 by means of the electrostatic force induced by the electric field formed by the electrostatic latent image formed on the recording medium 8 and by the particle feed roll 18A of the ink receiving particle supply unit 18.

Further, the electrostatic recording head 100 may select a region for forming the electrostatic latent image. Accordingly, the electrostatic latent image formed on the surface of the recording medium 8 is the region at which the ink image is formed. For example, FIG. 10A conceptually illustrates the formation of an electrostatic latent image of a Japanese character.

The recording medium 8, on the surface of which the electrostatic latent image has been formed, is sent to the ink receiving particle supply unit 18, and the electrostatic latent image is visualized, to form an ink receiving particle layer 16A corresponding to the electrostatic latent image (see FIG. 10B). As a result, the ink receiving particle layer 16A is formed only in the region on the recording medium 8 of the ink image to be formed based on the image signal (the ink receiving particle layer 16A is hardly formed at all in a non-image region).

Next, the description returns to the explanation of the image forming process.

Next, as shown in FIG. 10A, a preliminary fixing device 150 preliminarily fixes the ink receiving particle layer 16A formed on the recording medium 8.

The ink receiving particle layer 16A formed on the recording medium 8 is fixed to the recording medium 8 with electrostatic force. Accordingly, when the ink droplets 20A are ejected onto the ink receiving particle layer 16A from the inkjet recording head 20 in this state in the next process, the ink receiving particle layer 16A may be disturbed depending on the amount of ink. As a result, preliminary fixing of the ink receiving particle layer 16A in advance will temporarily fix the ink receiving particles 16 onto the surface of the recording medium 8.

Further, the preliminary fixing prevents scattering of the ink receiving particles 16 due to ejection of the ink droplets 20A and prevents contamination of the nozzle surface 20B of the inkjet recording head 20.

Preheating in the preliminary fixing device 150 is executed at a lower heating temperature than the heating for fixing in the final fixing device 23. In other words, the preliminary fixing in the preliminary fixing device 150 does not need to completely melt and fix the resin particles in the ink receiving particles 16 by pressure; rather, it is sufficient to bind the particles together and bind the particles with the surface of the recording medium, leaving voids between the particles. As a result, preliminary fixing is accomplished to the extent that the ink droplets 20A may be received.

Further, as the preliminary fixing device 150, the general heat fixing device (fuser) used in the electrophotographic image forming apparatus may be applied. In addition, other than the heat fixing device used in the electrophotographic image forming apparatus, a heating process using a heater, a heating process using an oven, an electromagnetic induction heating process or the like may also be used.

Next, the recording medium 8, onto which the ink receiving particle layer 16A has been preliminarily fixed, is conveyed to below the inkjet recording head 20.

Then, based on the image data, the ink droplets 20A are ejected from the inkjet recording head 20, and are applied to the ink receiving particle layer 16A formed at the surface of the recording medium 8, and an ink image is formed (FIG. 10C). Here, the ink is received by the ink receiving particles 16.

Further, in order to write the image at high speed, a line-type inkjet recording head having a width equal to or larger than the width of the recording medium as in the present exemplary embodiment may be used; however, sequential formation of the image using a scanning type inkjet recording head may also be employed. Further, the ink ejection unit of the inkjet recording head 20 is not limited as long as it is an ink ejectable means such as a piezoelectric element driving type or an exothermic heat element driving type.

Then, the recording medium 8 is released from the conveyer belt 13 and sent to the fixing device 23. By applying pressure and heat to the ink receiving particle layer 16A, the ink receiving particle layer 16A is fixed onto the recording medium 8.

The fixing device 23 is configured by a heating roll 23A with a heat source built in and an opposing pressure roll 23B. The heating roll 23A and the pressure roll 23B contact each other to form a nip part. As the heating roll 23A and the pressure roll 23B, for example, rolls fabricated by covering silicone rubber over the outer surface of an aluminum core, and further covering with a PFA tube, are used. Further, the device has the same configuration as the fixing device (fuser) used in an electrophotographic image forming apparatus. Further, other than the heat fixing device used in the electrophotographic image forming apparatus, a heating process using a heater, a heating process using an oven, an electromagnetic induction heating process or the like may also be used.

When the recording medium 8 passes through the contact part between the heating roll 23A and the pressure roll 23B, the ink receiving particle layer 16A is heated and pressed and, as a result, the ink receiving particle layer 16A is fixed onto the recording medium 8. Further, other than the method of using both heating and pressing, a method of using only heating or of using only pressing may be applied. However, a method of heating and pressing simultaneously may also be used.

Via the above-mentioned process, image formation is completed and the recording medium 8 is outputted from the recording apparatus.

In the recording apparatus 11 according to the other exemplary embodiment described above, while conveying the recording medium 8 by means of the conveyer belt 13, an electrostatic latent image is formed by the electrostatic recording head 100, and the ink receiving particles 16 are supplied onto the electrostatic latent image from a particle supply unit 18, whereby a particle layer is formed. Then, ink droplets are ejected from the inkjet recording head 20 onto the particle layer, and the image is formed. As a result, the ink receiving particles 16 are made to receive the ink. Then, after the recording medium 8 is released from the conveyer belt 13, the ink receiving particle layer is fixed onto the recording medium 8 by the application of pressure and heat by the fixing device 23. Further, because the apparatus 11 is similar to the recording apparatus of the exemplary embodiment as described above except for above description, further explanation is omitted.

In the exemplary embodiments, ink droplets 20A are selectively ejected from the inkjet recording heads 20 in the respective colors of black, yellow, magenta, and cyan on the basis of image data, and a full-color image is recorded on the recording medium 8. However the invention is not limited to the recording of characters or images on a recording medium. That is, the liquid droplet ejection apparatus according to the exemplary embodiment of the invention may be applied generally in liquid droplet ejection (jetting) apparatuses used industrially.

EXAMPLES

The present invention is more specifically described below with reference to examples. However, the respective examples do not limit the scope of the invention. Unless otherwise stated, "part(s)" means "part(s) by weight".

[Preparation of Ink Receiving Particles]

Respective ink receiving particles are prepared in the following manner.

(Ink Receiving Particles A)

Styrene/n-butyl methacrylate/hydroxybutyl acrylate/acrylic acid copolymer (acid value: 220): 100 parts by weight Sodium hydroxide: 9.4 parts by weight Ion exchanged water: 1000 parts by weight The above materials are mixed and stirred. The resulting mixed liquid is dried using a spray drying apparatus (NL-5, manufactured by Ohkawara Kakohki Co., Ltd.), and classified with an air classifier to obtain particles.

Subsequently, to 100 parts by weight of the particles thus obtained, 0.5 parts by weight of amorphous silica (Aerosil A130, manufactured by Degussa) and 0.5 parts by weight of amorphous silica (Aerosil RX200, manufactured by Degussa) are added, and mixed to prepare ink receiving particles.

(Ink Receiving Particles B)

Styrene/hydroxyethyl acrylate/acrylic acid copolymer (acid value: 210): 100 parts by weight Sodium hydroxide: 6.0 parts by weight Ion exchanged water: 1000 parts by weight The above materials are mixed and stirred. The resulting mixed liquid is dried using a spray drying apparatus (NL-5, manufactured by Ohkawara Kakohki Co., Ltd.), and classified with an air classifier to obtain particles.

Subsequently, to 100 parts by weight of the particles thus obtained, 0.25 parts by weight of amorphous silica (Aerosil TT600, manufactured by Degussa) and 0.75 parts by weight of amorphous silica (Aerosil OX50, manufactured by Degussa) are added, and mixed to prepare ink receiving particles.

(Ink Receiving Particles C)

Styrene/n-butyl acrylate/diethyleneglycol monoacrylate/methacrylic acid copolymer (acid value: 150): 100 parts by weight Sodium hydroxide: 6.2 parts by weight
Ion exchanged water: 1000 parts by weight The above materials are mixed and stirred. The resulting mixed liquid is dried using a spray drying apparatus (NL-5, manufactured by Ohkawara Kakohki Co., Ltd.), and classified with an air classifier to obtain particles.

Subsequently, to 100 parts by weight of the particles thus obtained, 0.75 parts by weight of amorphous silica (Aerosil R972, manufactured by Degussa) and 0.25 parts by weight of amorphous silica (Aerosil A200, manufactured by Degussa) are added, and mixed to prepare ink receiving particles.

(Ink Receiving Particles D)
Styrene/2-ethylhexyl acrylate/hydroxypropyl acrylate/maleic acid copolymer (acid value: 180): 100 parts by weight
Sodium hydroxide: 5.2 parts by weight
Ion exchanged water: 1000 parts by weight The above materials are mixed and stirred. The resulting mixed liquid is dried using a spray drying apparatus (NL-5, manufactured by Ohkawara Kakohki Co., Ltd.), and classified with an air classifier to obtain particles.

Subsequently, to 100 parts by weight of the particles thus obtained, 0.25 parts by weight of amorphous silica (Aerosil NAX50, manufactured by Degussa) and 0.75 parts by weight of amorphous silica (Aerosil A300, manufactured by Degussa) are added, and mixed to prepare ink receiving particles.

(Ink Receiving Particles E)
Styrene/n-butyl methacrylate/hydroxybutyl acrylate/acrylic acid copolymer (acid value: 120): 100 parts by weight
Sodium hydroxide: 5.2 parts by weight
Ion exchanged water: 1000 parts by weight The above materials are mixed and stirred. The resulting mixed liquid is dried using a spray drying apparatus (NL-5, manufactured by Ohkawara Kakohki Co., Ltd.), and classified with an air classifier to obtain particles.

Subsequently, to 100 parts by weight of the particles thus obtained, 0.5 parts by weight of amorphous silica (Aerosil TT600, manufactured by Degussa) and 0.5 parts by weight of amorphous silica (Aerosil OX50, manufactured by Degussa) are added, and mixed to prepare ink receiving particles.

(Ink Receiving Particles F)
Styrene/hydroxybutyl acrylate/acrylic acid copolymer (acid value: 140): 100 parts by weight
Sodium hydroxide: 9.7 parts by weight
Ion exchanged water: 1000 parts by weight The above materials are mixed and stirred. The resulting mixed liquid is dried using a spray drying apparatus (NL-5, manufactured by Ohkawara Kakohki Co., Ltd.), and classified with an air classifier to obtain particles.

Subsequently, to 100 parts by weight of the particles thus obtained, 0.25 parts by weight of amorphous silica (Aerosil RY200S, manufactured by Degussa) and 0.75 parts by weight of amorphous silica (Aerosil A200, manufactured by Degussa) are added, and mixed to prepare ink receiving particles.

(Ink Receiving Particles G)
Styrene/hydroxybutyl acrylate/methacrylic acid copolymer (acid value: 110): 100 parts by weight
Sodium hydroxide: 7.9 parts by weight
Ion exchanged water: 1000 parts by weight The above materials are mixed and stirred. The resulting mixed liquid is dried using a spray drying apparatus (NL-5, manufactured by Ohkawara Kakohki Co., Ltd.), and classified with an air classifier to obtain particles.

Subsequently, to 100 parts by weight of the particles thus obtained, 0.75 parts by weight of amorphous silica (Aerosil TT600, manufactured by Degussa) and 0.25 parts by weight of amorphous silica (Aerosil A50, manufactured by Degussa) are added, and mixed to prepare ink receiving particles.

(Ink Receiving Particles H)
n-butyl methacrylate/diethyleneglycol monoacrylate/acrylic acid copolymer (acid value: 130): 100 parts by weight
Sodium hydroxide: 9.2 parts by weight
Ion exchanged water: 1000 parts by weight The above materials are mixed and stirred. The resulting mixed liquid is dried using a spray drying apparatus (NL-5, manufactured by Ohkawara Kakohki Co., Ltd.), and classified with an air classifier to obtain particles.

Subsequently, to 100 parts by weight of the particles thus obtained, 0.25 parts by weight of amorphous silica (Aerosil RX300, manufactured by Degussa) and 0.75 parts by weight of amorphous silica (Aerosil A150, manufactured by Degussa) are added, and mixed to prepare ink receiving particles.

(Ink Receiving Particles I)
styrene/n-butyl methacrylate/acrylic acid copolymer (acid value: 250): 100 parts by weight
Sodium hydroxide: 10 parts by weight
Ion exchanged water: 1000 parts by weight The above materials are mixed and stirred. The resulting mixed liquid is dried using a spray drying apparatus (NL-5, manufactured by Ohkawara Kakohki Co., Ltd.), and classified with an air classifier to obtain particles.

Subsequently, to 100 parts by weight of the particles thus obtained, 0.25 parts by weight of amorphous silica (Aerosil TT600, manufactured by Degussa) and 0.75 parts by weight of amorphous silica (Aerosil OX50, manufactured by Degussa) are added, and mixed to prepare ink receiving particles.

(Ink Receiving Particles J)
styrene/hydroxybutyl acrylate/acrylic acid copolymer (acid value: 90): 100 parts by weight
Sodium hydroxide: 5.5 parts by weight
Ion exchanged water: 1000 parts by weight The above materials are mixed and stirred. The resulting mixed liquid is dried using a spray drying apparatus (NL-5, manufactured by Ohkawara Kakohki Co., Ltd.), and classified with an air classifier to obtain particles.

Subsequently, to 100 parts by weight of the particles thus obtained, 0.25 parts by weight of amorphous silica (Aerosil RY200S, manufactured by Degussa) and 0.75 parts by weight of amorphous silica (Aerosil A200, manufactured by Degussa) are added, and mixed to prepare ink receiving particles.

(Ink Receiving Particles K)
styrene/hydroxybutyl acrylate/acrylic acid/styrenesulfonic acid copolymer (acid value: 180): 100 parts by weight
Sodium hydroxide: 8.5 parts by weight
Ion exchanged water: 1000 parts by weight The above materials are mixed and stirred. The resulting mixed liquid is dried using a spray drying apparatus (NL-5, manufactured by Ohkawara Kakohki Co., Ltd.), and classified with an air classifier to obtain particles.

Subsequently, to 100 parts by weight of the particles thus obtained, 0.5 parts by weight of amorphous silica (Aerosil A130, manufactured by Degussa) and 0.5 parts by weight of amorphous silica (Aerosil RX200, manufactured by Degussa) are added, and mixed to prepare ink receiving particles.

The properties of the respective ink receiving particles thus obtained are shown in Table 1.

[Preparation of Ink]

Respective inks are prepared in the following manner. The treatment method of the pigment is as follows.

—Pigment Treatment Method—

A sulfanilic acid aqueous solution is heated, and 100 g of a pigment is added thereto while stirring. The resulting mixture is cooled to room temperature while stirring, and 14 g of concentrated nitric acid solution is added dropwise thereto. To the resulting solution, 10 g of $NaNO_2$ aqueous solution is added, and stirred until the reaction is completed. Then, the pigment is subjected to a desalting treatment. To the obtained surface treated pigment, ion exchanged water is added so as to have a pigment concentration of 12% by weight, the pH is adjusted to 7.5, and a dispersion treatment is carried out using an ultrasonic homogenizer. The dispersion liquid is subjected to a centrifugal separation treatment (8000 rpm×30 minutes) with a centrifugal separator, and the remaining portion (20% of the whole) is removed therefrom.

(Ink A)

The following ink components are mixed and stirred, and then filtered through a membrane filter having a pore size of 5 μm to prepare an ink.
Cabojet 300: 5% by weight
Glycerin: 5% by weight
Diethylene glycol: 5% by weight
1,2-hexanediol: 10% by weight
Diethylene glycol monobutyl ether: 8% by weight
SFN465 (surfactant, manufactured by Nisshin Chemical Co., Ltd.): 1.5% by weight
Ion exchanged water: the balance The obtained ink has a surface tension of 29 mN/m.

(Ink B)

The following ink components are mixed and stirred, and then filtered through a membrane filter having a pore size of 5 μm to prepare an ink.
Self-dispersing pigment (C.I. Pigment Blue 15:3, treated by the above pigment treatment method): 5% by weight
Triethylene glycol: 5% by weight
Propylene glycol: 5% by weight
1,2-hexanediol: 5% by weight
Diethylene glycol monobutyl ether: 5% by weight
SFN465 (surfactant, manufactured by Nisshin Chemical Co., Ltd.): 1.5% by weight
Ion exchanged water: the balance The obtained ink has a surface tension of 30 mN/m.

(Ink C)

The following ink components are mixed and stirred, and then filtered through a membrane filter having a pore size of 5 μm to prepare an ink.
Cabojet 260: 5% by weight
Glycerin: 5% by weight
Triethylene glycol: 5% by weight
1,2-hexanediol: 10% by weight
Diethylene glycol monobutyl ether: 8% by weight
SFN465 (surfactant, manufactured by Nisshin Chemical Co., Ltd.): 1.5% by weight
Ion exchanged water: the balance The obtained ink has a surface tension of 28 mN/m.

(Ink D)

The following ink components are mixed and stirred, and then filtered through a membrane filter having a pore size of 5 μm to prepare an ink.
Self-dispersing pigment (Black Pearls L, treated by the above pigment treatment method): 5% by weight
Triethylene glycol: 10% by weight
1,2-hexanediol: 10% by weight
Diethylene glycol monobutyl ether: 10% by weight
SFN465 (surfactant, manufactured by Nisshin Chemical Co., Ltd.): 1.5% by weight
Ion exchanged water: the balance The obtained ink has a surface tension of 29 mN/m.

(Ink E)

The following ink components are mixed and stirred, and then filtered through a membrane filter having a pore size of 5 μm to prepare an ink.
Cabojet 250: 5% by weight
Glycerin: 6% by weight
Diethylene glycol: 4% by weight
1,2-hexanediol: 5% by weight
Diethylene glycol monobutyl ether: 5% by weight
SFN465 (surfactant, manufactured by Nisshin Chemical Co., Ltd.): 1.5% by weight
Ion exchanged water: the balance The obtained ink has a surface tension of 30 mN/m.

(Ink F)

The following ink components are mixed and stirred, and then filtered through a membrane filter having a pore size of 5 μm to prepare an ink.
Cabojet 300: 5% by weight
Glycerin: 25% by weight
Diethylene glycol: 10% by weight
Diethylene glycol monobutyl ether: 5% by weight
SFN465 (surfactant, manufactured by Nisshin Chemical Co., Ltd.): 1.5% by weight
Ion exchanged water: the balance The obtained ink has a surface tension of 30 mN/m.

(Ink G)

The following ink components are mixed and stirred, and then filtered through a membrane filter having a pore size of 5 μm to prepare an ink.
Cabojet 250: 5% by weight
Glycerin: 10% by weight
Propylene glycol: 10% by weight
Diethylene glycol monobutyl ether: 5% by weight
SFN465 (surfactant, manufactured by Nisshin Chemical Co., Ltd.): 1.5% by weight
Ion exchanged water: the balance The obtained ink has a surface tension of 29 mN/m.

Examples 1-10 and Comparative Examples 1-3

The following evaluations are carried out using the particles (ink receiving particles) and the inks described above in accordance with Table 2. The evaluation results are shown in Table 2.

(Evaluations)

—Liquid Absorbing Property—

The liquid absorbing property is evaluated in the following manner. The method of applying the particles in each case is shown in Table 2 (application amount: 5-12 g/m$^2$). In the case of using a charging method, the particles are applied onto a PET film using a device which sprinkles particles by static electricity. In the case of using an adhering method, the particles are pressed against a silicone rubber sheet so that the particles adhere thereto. On these sheets onto which the particles have been applied, a 100% coverage pattern is formed to have an image area ratio of 1200 dpi×1200 dpi (dpi: dot number per inch) using a piezoelectric inkjet recording apparatus. Then, a sheet of plain paper (C2 paper, manufactured by FUJI XEROX CO., LTD.) is pressed at a pressure of $10^5$ Pa against the particles onto which the ink has been applied, and the time until no ink is transferred to the plain paper is measured. The evaluation criteria are as follows.

A: The drying time is less than 0.5 seconds.
B: The drying time is from 0.5 seconds to less than 1 second.
C: The drying time is from 1 second to less than 3 seconds.
D: The drying time is 3 seconds or more.

—Optical Density—

The optical density is evaluated in the following manner. The method of applying the particles in each case is shown in Table 2 (application amount: 5-12 g/m²). In the case of using a charging method, the particles are applied onto a PET film using a device which sprinkles particles by static electricity. In the case of using an adhering method, the particles are pressed against a silicone rubber sheet so that the particles adhere thereto. On these sheets onto which the particles have been applied, a 100% coverage pattern is formed to have an image area ratio of 1200 dpi×1200 dpi (dpi: dot number per inch) using a piezoelectric inkjet recording apparatus. Then, the particles onto which the ink has been applied are transferred and fixed onto a sheet of plain paper (C2 paper, manufactured by FUJI XEROX CO., LTD.) at a pressure of $10^5$ Pa and a temperature of 50° C., and left for 24 hours in normal environment. The optical density of the image portion is measured using an optical densitometer, X-Rite 404, manufactured by X-Rite Incorporated. The evaluation criteria are as follows.

A: The optical density is 1.45 or more.
B: The optical density is 1.4 or more but less than 1.45.
C: The optical density is 1.3 or more but less than 1.4.
D: The optical density is less than 1.3.

—Bleeding—

The bleeding is evaluated in the following manner. An image is formed in the same manner as in the evaluation of the optical density described above, except that a 1 dot line pattern is formed, and the bleeding of the line is observed with reference to a sample of the predetermined limitation to carry out a sensory evaluation. The evaluation criteria are as follows.

A: No bleeding is observed even when the magnified image (25 times) of the image portion is observed.
B: Bleeding can be observed when the magnified image (25 times) of the image portion is observed, but the bleeding cannot be observed with the naked eye and thus is acceptable.
C: Bleeding at the image portion is observed with the naked eye, but acceptable.
D: Severe bleeding at the image portion is observed with the naked eye, and unacceptable.

—Storage Stability—

The storage stability is evaluated in the following manner. The ink receiving particles which have been stored for 24 hours in an environment at a temperature of 23° C. and a humidity of 75% RH is used, and the liquid absorbing property evaluation described above is carried out. The evaluation criteria are as follows.

A: The drying time is less than 0.5 seconds.
B: The drying time is from 0.5 seconds to less than 1 second.
C: The drying time is from 1 second to less than 3 seconds.
D: The drying time is 3 seconds or more.

TABLE 1

Properties of ink receiving particles

| | Hydrophobic monomer component | Hydrophilic monomer components | | | Monomer component having dissociable group | Total molar ratio of hydrophilic monomer | Mixed SP value of monomer components other than monomer component having |
| | | Monomer having hydroxyl group | | | | | |
| --- | --- | --- | --- | --- | --- | --- | --- |
| | (structure) | Structure | SP value | Molar ratio | (structure) | components | dissociable group |
| Particles A | St/n-BMA | HBA | 13.0 | 17.5% | AA | 57.5% | 11.1 |
| Particles B | St | HEA | 14.5 | 5% | AA | 40% | 10.9 |
| Particles C | St/n-BA | DEGA | 13.0 | 25% | MAA | 55% | 11.3 |
| Particles D | St/2-EHA | HPA | 13.6 | 10% | MA | 30% | 10.8 |
| Particles E | St/n-BMA | HBA | 13.0 | 40% | AA | 65% | 11.8 |
| Particles F | St | HBA | 13.0 | 70% | AA | 99% | 13.0 |
| Particles G | St | HBA | 13.0 | 65% | AA | 90% | 12.7 |
| Particles H | n-BMA | DEGA | 13.0 | 50% | AA | 80% | 12.0 |
| Particles I | St/n-BMA | None | | | AA | — | — |
| Particles J | St | HBA | 13.0 | 80% | AA | 99% | 13.0 |
| Particles K | St | HBA | 13.0 | 30% | AA/styrenesulfonic acid | 55% | 11.5 |

TABLE 2

| | Ink receiving particles | | | | Ink | | SP value difference (absolute value) | | Liquid absorbing property | Optical density | Bleeding | Storage stability |
| --- | --- | --- | --- | --- | --- | --- | --- | --- | --- | --- | --- | --- |
| | Kind | SP value (1) | SP value (2) | Applying method | Kind | SP value (3) | (1) − (3) | (2) − (3) | | | | |
| Example 1 | Particles A | 11.1 | 13.0 | Electrostatic method | Ink A | 14.6 | 3.5 | 1.6 | B | B | B | B |
| Example 2 | Particles B | 10.9 | 14.5 | Electrostatic method | Ink B | 13.9 | 3.0 | 0.6 | B | B | B | B |
| Example 3 | Particles C | 11.3 | 13.0 | Electrostatic method | Ink C | 14.4 | 3.1 | 1.4 | B | B | B | B |
| Example 4 | Particles D | 10.8 | 13.6 | Electrostatic method | Ink D | 12.6 | 1.8 | 1.0 | A | A | A | A |
| Example 5 | Particles E | 11.8 | 13.0 | Electrostatic method | Ink E | 15.7 | 3.9 | 2.7 | B | C | C | B |

TABLE 2-continued

|  | Ink receiving particles | | | Ink | | SP value difference (absolute value) | | Liquid absorbing property | Optical density | Bleed-ing | Storage stability |
|---|---|---|---|---|---|---|---|---|---|---|---|
|  | Kind | SP value (1) | SP value (2) | Applying method | Kind | SP value (3) | (1) − (3) | (2) − (3) | | | | |
| Example 6 | Particles F | 13.0 | 13.0 | Adhering method | Ink A | 14.6 | 1.6 | 1.6 | A | A | A | B |
| Example 7 | Particles G | 12.7 | 13.0 | Adhering method | Ink D | 12.6 | 0.1 | 0.4 | A | A | A | A |
| Example 8 | Particles H | 12.0 | 13.0 | Adhering method | Ink C | 14.4 | 2.4 | 1.4 | B | B | B | B |
| Example 9 | Particles J | 13.0 | 13.0 | Adhering method | Ink C | 14.4 | 1.4 | 1.4 | A | A | A | C |
| Example 10 | Particles K | 11.5 | 13.0 | Adhering method | Ink C | 14.4 | 2.9 | 1.4 | B | B | B | B |
| Comparative Example 1 | Particles A | 11.1 | 13.0 | Electrostatic method | Ink F | 18.1 | 7 | 5.1 | C | C | C | B |
| Comparative Example 2 | Particles B | 10.9 | 14.7 | Electrostatic method | Ink G | 17.0 | 6.1 | 2.3 | C | C | C | B |
| Comparative Example 3 | Particles I | — | — | Electrostatic method | Ink A | 14.6 | — | — | C | C | C | B |

In Table 2, SP value (1) is a mixed SP value of monomer components other than a monomer component having a dissociable group, SP value (2) is a SP value of a monomer component having a hydroxyl group, and SP value (3) is a mixed SP value of all the organic solvents included therein.
Meanings of the abbreviations in the above Table are as follows.
St: styrene
n-BMA: n-butyl methacrylate
2-EHA: 2-ethylhexyl acrylate
n-BA: n-butyl acrylate
HBA: hydroxybutyl acrylate
HEA: hydroxyethyl acrylate
DEGA: diethylene glycol monoacrylate
HPA: hydroxypropyl acrylate
HBA: hydroxybutyl acrylate
AA: acrylic acid
MAA: methacrylic acid
MA: maleic acid It may be understood from the above results that the Examples, in which a specific ink and specific ink receiving particles are combined, are excellent in liquid absorbing property as well as in image density, bleeding, and storage stability, compared to the Comparative Examples.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A material set for recording, comprising:
   an ink including a recording material, an organic solvent, and water; and
   ink receiving particles including an organic resin containing hydrophilic monomer components and one or more hydrophobic monomer components, the hydrophilic monomer components containing a monomer component having a hydroxyl group and a monomer component having a dissociable group,
   an absolute value of a difference between a solubility parameter (SP value) of the organic solvent included in the ink and a solubility parameter (SP value) of monomer components included in the organic resin, other than the monomer component having a dissociable group, being less than 5, and
   a content ratio of the monomer component having a hydroxyl group with respect to the total amount of monomer components included in the organic resin being from about 1 mol % to about 75 mol %.

2. The material set of claim 1, wherein an absolute value of a difference between the solubility parameter (SP value) of the organic solvent included in the ink and a solubility parameter (SP value) of the monomer component having a hydroxyl group included in the organic resin is less than 2.

3. The material set of claim 1, wherein a content ratio of the hydrophilic monomer components with respect to the total amount of monomer components included in the organic resin is from about 10 mol % to less than 100 mol %.

4. The material set of claim 3, wherein a content ratio of the hydrophilic monomer components with respect to the total amount of monomer components included in the organic resin is from about 25 mol % to about 95 mol %.

5. The material set of claim 1, wherein the ink receiving particles have an average equivalent spherical diameter of from about 0.5 μm to about 50 μm.

6. A recording apparatus comprising:
   an intermediate transfer member,
   a supply unit that supplies ink receiving particles onto the intermediate transfer member,
   an ink ejection unit that ejects an ink onto the ink receiving particles that have been supplied onto the intermediate transfer member,
   a transfer unit that transfers the ink receiving particles onto a recording medium, and a fixing unit that fixes the ink receiving particles that have been transferred onto the recording medium, the ink including a recording material, an organic solvent, and water, the ink receiving particles including an organic resin containing hydrophilic monomer components and one or more hydrophobic monomer components, the hydrophilic monomer components containing a monomer component having a hydroxyl group and a monomer component having a dissociable group, an absolute value of a difference between a solubility parameter (SP value) of the organic solvent included in the ink and a solubility parameter (SP value) of monomer components included in the organic resin, other than the monomer component having a dissociable group, being less than 5, and a content ratio of the monomer component having a hydroxyl group with respect to the total amount of monomer components included in the organic resin being from about 1 mol % to about 75 mol %.

7. The recording apparatus of claim 6, wherein an absolute value of a difference between the solubility parameter (SP value) of the organic solvent included in the ink and a solubility parameter (SP value) of the monomer component having a hydroxyl group included in the organic resin is less than 2.

8. The recording apparatus of claim 6, wherein a content ratio of the hydrophilic monomer components with respect to the total amount of monomer components included in the organic resin is from 10 mol % to less than 100 mol %.

9. The recording apparatus of claim 8, wherein a content ratio of the hydrophilic monomer components with respect to the total amount of monomer components included in the organic resin is from about 25 mol % to about 95 mol %.

10. A recording apparatus comprising:
a supply unit that supplies ink receiving particles onto a recording medium,
an ink ejection unit that ejects an ink onto the ink receiving particles that have been supplied onto the recording medium, and
a fixing unit that fixes the ink receiving particles that have been supplied onto the recording medium, the ink including a recording material, an organic solvent, and water, the ink receiving particles including an organic resin containing hydrophilic monomer components and one or more hydrophobic monomer components, the hydrophilic monomer components containing a monomer component having a hydroxyl group and a monomer component having a dissociable group, an absolute value of a difference between a solubility parameter (SP value) of the organic solvent included in the ink and a solubility parameter (SP value) of monomer components included in the organic resin, other than the monomer component having a dissociable group, being less than 5, and a content ratio of the monomer component having a hydroxyl group with respect to the total amount of monomer components included in the organic resin, being from about 1 mol % to about 75 mol %.

11. The recording apparatus of claim 10, wherein an absolute value of a difference between the solubility parameter (SP value) of the organic solvent included in the ink and a solubility parameter (SP value) of the monomer component having a hydroxyl group included in the organic resin is less than 2.

12. The recording apparatus of claim 10, wherein a content ratio of the hydrophilic monomer components with respect to the total amount of monomer components included in the organic resin is from 10 mol % to less than 100 mol %.

13. The recording apparatus of claim 12, wherein a content ratio of the hydrophilic monomer components with respect to the total amount of monomer components included in the organic resin is from about 25 mol % to about 95 mol %.

* * * * *